United States Patent
Li et al.

(10) Patent No.: US 12,316,578 B2
(45) Date of Patent: May 27, 2025

(54) COMMUNICATION METHOD AND APPARATUS

(71) Applicant: HUAWEI TECHNOLOGIES CO., LTD., Guangdong (CN)

(72) Inventors: Xinxian Li, Shanghai (CN); Jiehua Xiao, Shanghai (CN); Hao Tang, Ottawa (CA); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 415 days.

(21) Appl. No.: 17/464,673

(22) Filed: Sep. 1, 2021

(65) Prior Publication Data

US 2021/0399866 A1 Dec. 23, 2021

Related U.S. Application Data

(63) Continuation of application No. PCT/CN2020/077315, filed on Feb. 29, 2020.

(30) Foreign Application Priority Data

Mar. 29, 2019 (CN) .......................... 201910248237.4

(51) Int. Cl.
H04W 24/10 (2009.01)
H04L 5/00 (2006.01)
H04W 72/20 (2023.01)

(52) U.S. Cl.
CPC ............ *H04L 5/0098* (2013.01); *H04L 5/001* (2013.01); *H04L 5/0053* (2013.01); *H04W 72/20* (2023.01)

(58) Field of Classification Search
None
See application file for complete search history.

(56) References Cited

U.S. PATENT DOCUMENTS

2011/0249582 A1* 10/2011 Choi ..................... H04W 72/21
370/252
2013/0028182 A1 1/2013 Geirhofer et al.
(Continued)

FOREIGN PATENT DOCUMENTS

CN 102238747 A 11/2011
CN 102624494 A 8/2012
(Continued)

OTHER PUBLICATIONS

Intel Corporation, Activation of SCell containing BWPs. 3GPP TSG-RAN WG2 Meeting#99bis, Prague, Czech, Oct. 9-13, 2017, R2-1711643, 4 pages.
(Continued)

*Primary Examiner* — Sithu Ko

(57) ABSTRACT

This application provides a communication method and apparatus. The method includes: A terminal receives first control information, where the first control information is used to trigger a channel state information (CSI) operation corresponding to a first secondary component carrier, the first secondary component carrier is in a deactivated state, and the CSI operation includes one or more of the following: aperiodic CSI reporting, aperiodic CSI measurement, semi-persistent CSI reporting, or semi-persistent CSI measurement. The terminal performs, based on the first control information, the CSI operation corresponding to the first secondary component carrier.

17 Claims, 5 Drawing Sheets

(56) References Cited

U.S. PATENT DOCUMENTS

| | | | |
|---|---|---|---|
| 2015/0215929 A1 | 7/2015 | Damnjanovic et al. | |
| 2015/0334603 A1 | 11/2015 | Uchino et al. | |
| 2016/0212752 A1* | 7/2016 | Xu | H04W 72/542 |
| 2017/0034840 A1* | 2/2017 | Mandil | H04W 72/12 |
| 2017/0041820 A1* | 2/2017 | Wei | H04W 72/04 |
| 2018/0007731 A1 | 1/2018 | Park et al. | |
| 2019/0081679 A1* | 3/2019 | Davydov | H04W 72/23 |
| 2019/0103954 A1* | 4/2019 | Lee | H04L 5/0098 |
| 2019/0150183 A1* | 5/2019 | Aiba | H04W 24/10 370/336 |
| 2019/0208436 A1* | 7/2019 | Zhou | H04L 1/0009 |
| 2019/0229781 A1* | 7/2019 | Jin | G06T 7/73 |
| 2020/0029235 A1* | 1/2020 | Yokomakura | H04W 80/02 |
| 2020/0145164 A1* | 5/2020 | Cheng | H04W 52/265 |
| 2020/0351851 A1* | 11/2020 | Aiba | H04W 72/23 |
| 2021/0203468 A1* | 7/2021 | Yi | H04W 72/0453 |

FOREIGN PATENT DOCUMENTS

| | | |
|---|---|---|
| CN | 103858467 A | 6/2014 |
| CN | 104584633 A | 4/2015 |
| CN | 107113056 A | 8/2017 |
| CN | 107431592 A | 12/2017 |
| CN | 107852752 A | 3/2018 |
| CN | 108064083 A | 5/2018 |
| CN | 108574992 A | 9/2018 |
| CN | 108683487 A | 10/2018 |
| CN | 109391986 A | 2/2019 |
| WO | WO-2011135916 A1 * 11/2011 ........... H04L 1/0073 |
| WO | 2015152554 A1 | 10/2015 |
| WO | 2018174772 A1 | 9/2018 |
| WO | 2019029330 A1 | 2/2019 |

OTHER PUBLICATIONS

3GPP TS 38.321 V15.4.0:"3rd Generation Partnership Project; Technical Specification Group Radio Access Network; NR; Medium Access Control (MAC) protocol specification (Release 15)",Dec. 2018,total 77 pages.

* cited by examiner

COMMUNICATION METHOD AND APPARATUS

CROSS-REFERENCE TO RELATED APPLICATIONS

This application is a continuation of International Application No. PCT/CN2020/077315, filed on Feb. 29, 2020, which claims priority to Chinese Patent Application No. 201910248237.4, filed on Mar. 29, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a wireless communication network, a carrier aggregation (CA) technology may provide more transmission bandwidth for a terminal by using a plurality of carriers (for example, a primary component carrier and a secondary component carrier), to obtain a higher transmission rate. In CA technology, operations of activating and deactivating the secondary component carrier are supported. For example, the secondary component carrier may be activated by using a media access control (MAC) control element (CE). However, because processing time of the MAC CE is relatively long, it takes relatively long time to activate the secondary component carrier, and a requirement of a high-bandwidth service cannot be quickly met. Consequently, how to activate the secondary component carrier more quickly becomes an urgent problem to be resolved.

SUMMARY

Embodiments of this application provide a communication method and apparatus.

According to a first aspect, an embodiment of this application provides a communication method. The method may be performed by a terminal, and includes: receiving first control information from a network device, where the first control information is used to trigger (i.e., initiate) channel state information (CSI) reporting corresponding to a first secondary component carrier, and the first secondary component carrier is in a deactivated state; and reporting, based on the first control information, a CSI report corresponding to the first secondary component carrier. The CSI reporting may be aperiodic CSI reporting or semi-persistent CSI reporting, and the CSI report is an aperiodic CSI report or a semi-persistent CSI report. There may be one or more first secondary component carriers. Optionally, the first control information is downlink control information (DCI), and the DCI is carried by a physical downlink control channel (PDCCH). Optionally, the reported CSI report corresponding to the first secondary component carrier is carried by a physical uplink shared channel (PUSCH).

According to the foregoing method, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

Optionally, the first control information is used to trigger CSI reporting corresponding to a bandwidth part (BWP) of the first secondary component carrier, and the BWP is a first active BWP. The CSI reporting corresponding to the BWP of the first secondary component carrier is performed based on the first control information. In this implementation, CSI reporting corresponding to a BWP of a to-be-activated secondary component carrier can be triggered by using physical layer signaling. Because processing on the physical layer signaling is quicker, the CSI reporting corresponding to the BWP of the secondary component carrier is quicker, so that the network device can learn of an activation status of the secondary component carrier more quickly, thereby reducing time required for a secondary component carrier activation procedure.

With reference to the first aspect, in some implementations of the first aspect, the first control information may be further used to trigger to activate the first secondary component carrier. Optionally, the terminal activates the first secondary component carrier based on the first control information. In this implementation, the first control information can not only be used to trigger the terminal to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

With reference to the first aspect, in some implementations of the first aspect, second control information may be further received, where the second control information is used to trigger to activate the first secondary component carrier. Optionally, the second control information is carried by a MAC CE. Optionally, the terminal activates the first secondary component carrier based on the second control information. Optionally, after the second control information is received, the CSI reporting corresponding to the first secondary component carrier is performed based on the first control information. Optionally, before the first control information is received, feedback information corresponding to the second control information is sent, where the feedback information may be acknowledgment (ACK) information.

According to a second aspect, an embodiment of this application provides another communication method. The method may be performed by a terminal, and includes: receiving first configuration information from a network device, where the first configuration information includes first time information and second time information; and performing, based on the first time information or the second time information, a CSI operation corresponding to a second secondary component carrier. The CSI operation includes one or more of the following: aperiodic CSI reporting, aperiodic CSI measurement, semi-persistent CSI reporting, or semi-persistent CSI measurement. Optionally, the first configuration information is carried by higher layer signaling.

With reference to the second aspect, in some implementations of the second aspect, it is determined, based on an activation status of the second secondary component carrier, to perform the CSI operation corresponding to the second secondary component carrier by using the first time information or the second time information. Optionally, when the second secondary component carrier is in an activated state, the CSI operation corresponding to the second secondary component carrier is performed based on the first time information. Optionally, when the second secondary component carrier is in a deactivated state, the CSI operation corresponding to the second secondary component carrier is performed based on the second time information.

In the foregoing method, time information of the CSI operation can be properly configured based on an activation status of a secondary component carrier, so that time requirements of different secondary component carrier types on the CSI operation can be met, thereby improving CSI operation efficiency in carrier aggregation.

According to a third aspect, an embodiment of this application provides another communication method. The method may be performed by a network device, and includes: sending first control information to a terminal, where the first control information includes CSI request information corresponding to a first secondary component carrier, where the CSI request information is used to trigger the terminal to perform CSI reporting corresponding to the first secondary component carrier, the CSI reporting may be aperiodic CSI reporting or semi-persistent CSI reporting, and the first secondary component carrier is in a deactivated state; and receiving a CSI report corresponding to the first secondary component carrier from the terminal, where the CSI report is an aperiodic CSI report or a semi-persistent CSI report. There may be one or more first secondary component carriers. Optionally, the first control information is DCI, and the DCI is carried by a PDCCH. Optionally, the CSI report is carried by a PUSCH.

According to the foregoing method, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

Optionally, the CSI request information corresponding to the first secondary component carrier includes CSI request information corresponding to a BWP of the first secondary component carrier, and the BWP is a first active BWP. A CSI report corresponding to the BWP of the first secondary component carrier is received from the terminal. In this implementation, CSI reporting corresponding to a BWP of a to-be-activated secondary component carrier can be triggered by using physical layer signaling. Because processing on the physical layer signaling is quicker, the CSI reporting corresponding to the BWP of the secondary component carrier is quicker, so that the network device can learn of an activation status of the secondary component carrier more quickly, thereby reducing time required for a secondary component carrier activation procedure.

With reference to the third aspect, in some implementations of the third aspect, the first control information includes trigger activation information corresponding to the first secondary component carrier, and the trigger activation information is used to trigger to activate the first secondary component carrier. In this implementation, the first control information can not only be used to trigger to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

With reference to the third aspect, in some implementations of the third aspect, second control information may be further sent to the terminal, where the second control information includes trigger activation information corresponding to the first secondary component carrier, and the trigger activation information is used to trigger to activate the first secondary component carrier. Optionally, the second control information is carried by a MAC CE. Optionally, after the second control information is sent to the terminal, a CSI report corresponding to the first secondary component carrier is received from the terminal. Optionally, before the first control information is sent to the terminal and after the second control information is sent to the terminal, feedback information corresponding to the second control information is received from the terminal, where the feedback information may be ACK information.

According to a fourth aspect, an embodiment of this application provides another communication method. The method may be performed by a network device, and includes: sending first configuration information to a terminal, where the first configuration information includes first time information and second time information; and receiving, based on the first time information or the second time information, a CSI report corresponding to a second secondary component carrier from the terminal, where the CSI report is an aperiodic CSI report or a semi-persistent CSI report. Optionally, the first configuration information is carried by higher layer signaling.

With reference to the fourth aspect, in some implementations of the fourth aspect, it is determined, based on an activation status of the second secondary component carrier, to receive, by using the first time information or the second time information, the CSI report corresponding to the second secondary component carrier from the terminal. Optionally, when the second secondary component carrier is in an activated state, the CSI report corresponding to the second secondary component carrier is received from the terminal based on the first time information. Optionally, when the second secondary component carrier is in a deactivated state, the CSI report corresponding to the second secondary component carrier is received from the terminal based on the second time information.

In the foregoing method, time information of the CSI operation can be properly configured based on an activation status of a secondary component carrier, so that time requirements of different secondary component carrier types on the CSI operation can be met, thereby improving CSI operation efficiency in carrier aggregation.

According to a fifth aspect, an embodiment of this application provides an apparatus, to implement the method in the first aspect, any possible implementation of the first aspect, the second aspect, or any possible implementation of the second aspect. The apparatus includes a corresponding unit or component configured to perform the foregoing method. The unit included in the apparatus may be implemented by using software and/or hardware. The communication apparatus may be, for example, a terminal, or a chip, a chip system, or a processor that can support a terminal in implementing the foregoing method.

According to a sixth aspect, an embodiment of this application provides an apparatus, to implement the method in the third aspect, any possible implementation of the third aspect, the fourth aspect, or any possible implementation of the fourth aspect. The apparatus includes a corresponding unit or component configured to perform the foregoing method. The unit included in the apparatus may be implemented by using software and/or hardware. The communication apparatus may be, for example, a network device (for example, a base station), or a chip, a chip system, or a processor that can support the network device in implementing the foregoing method.

According to a seventh aspect, this application provides an apparatus, including a processor, where the processor is coupled to a memory, and the memory is configured to store a program or instructions. When the program or the instructions is/are executed by the processor, the apparatus is enabled to implement the method according to the first aspect, any possible implementation of the first aspect, the second aspect, or any possible implementation of the second aspect.

According to an eighth aspect, this application provides an apparatus, including a processor, where the processor is coupled to a memory, and the memory is configured to store a program or instructions. When the program or the instructions is/are executed by the processor, the apparatus is enabled to implement the method according to the third aspect, any possible implementation of the third aspect, the fourth aspect, or any possible implementation of the fourth aspect.

According to a ninth aspect, this application provides a storage medium, where the storage medium stores a computer program or instructions. When the computer program or the instructions is/are executed, a computer is enabled to perform the method according to the first aspect, any possible implementation of the first aspect, the second aspect, or any possible implementation of the second aspect.

According to a tenth aspect, this application provides a storage medium, where the storage medium stores a computer program or instructions. When the computer program or the instructions is/are executed, a computer is enabled to perform the method according to the third aspect, any possible implementation of the third aspect, the fourth aspect, or any possible implementation of the fourth aspect.

According to an eleventh aspect, an embodiment of this application provides a communication system, including the apparatuses according to the fifth aspect and the sixth aspect.

DESCRIPTION OF EMBODIMENTS

Figure 1:
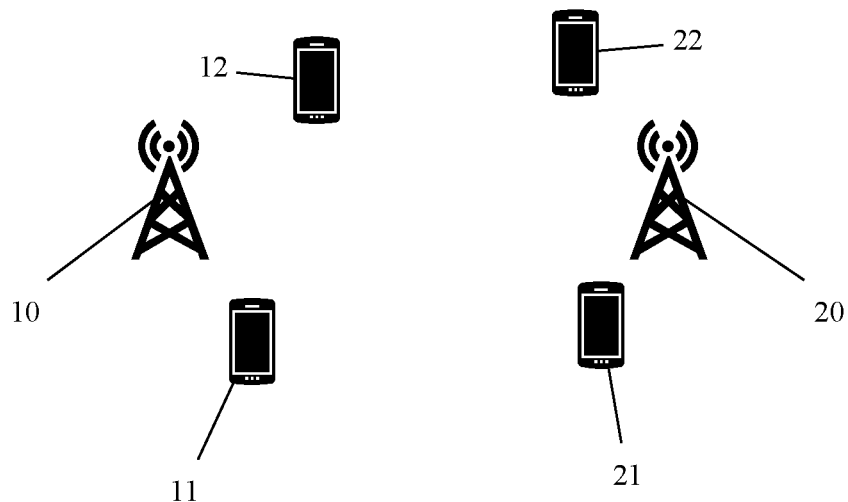
FIG. 1 is a schematic diagram of a communication system applied to an embodiment of this application.

The communication method and apparatus that are provided in the embodiments of this application may be applied to a communication system. FIG. 1 is a schematic structural diagram of a communication system. The communication system includes one or more network devices (where for clarity, a network device 10 and a network device 20 are shown in the figure), and one or more terminal devices that communicate with the one or more network devices. In FIG. 1, a terminal device 11 and a terminal device 12 communicate with the network device 10, and a terminal device 21 and a terminal device 22 communicate with the network device 20. It may be understood that the network devices and the terminal devices may also be referred to as communication devices.

The technologies described in the embodiments of the present invention may be used in various communication systems, for example, 2G, 3G, 4G, 4.5G, and 5G communication systems, a system in which a plurality of communication systems are integrated, or a future evolved network. The communication systems include, for example, a long term evolution (LTE) system, a new radio (NR) system, a wireless fidelity (WiFi) system, a cellular system related to the 3rd generation partnership project (3GPP), and another communication system of this type.

Figure 2:
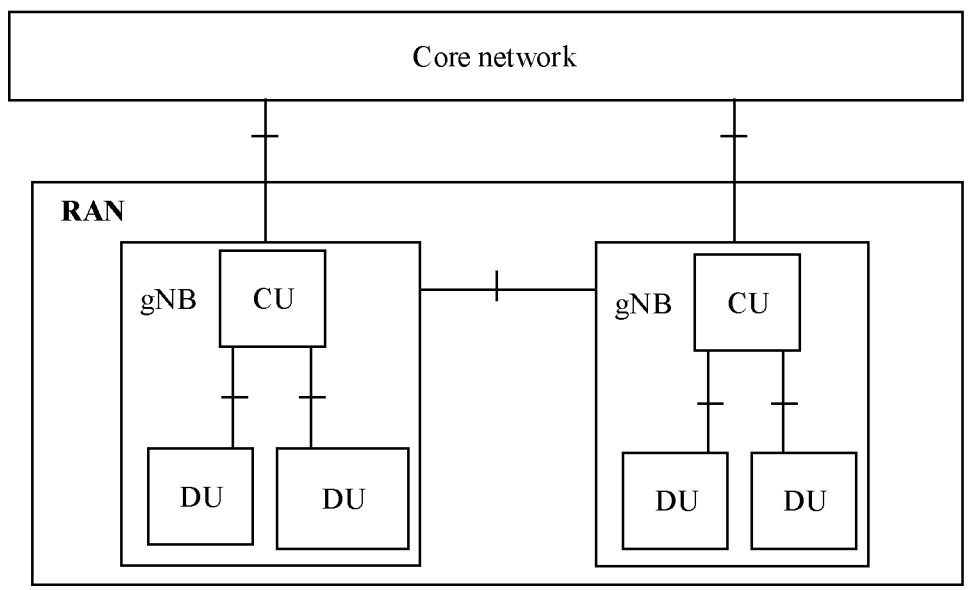
FIG. 2 is a schematic diagram of an example of an architecture of a communication system.

FIG. 2 is a schematic diagram of an example of a possible architecture of a communication system. As shown in FIG. 2, a network device in a radio access network (RAN) is a base station (such as a gNodeB or a gNB) with an architecture in which a centralized unit (CU) and a distributed unit (DU) are separated. The RAN may be connected to a core network (for example, an LTE core network or a 5G core network). The CU and the DU may be understood as division of the base station from a logical function perspective. The CU and the DU may be physically separated or physically deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are configured on the CU, but functions of a radio link control (RLC) layer, a media access control (MAC) layer, and a physical layer are configured on the DU. It may be understood that, division into processing functions of the CU and the DU based on the protocol layers is merely an example, and the processing functions of the CU and the DU may alternatively be obtained through division in another manner. For example, the CU or the DU may be obtained through division to have functions of more protocol layers. For example, the CU or the DU may alternatively be obtained through division to have some processing functions of protocol layers. In a design, some functions of the RLC layer and functions of a protocol layer above the RLC layer are configured on the CU, and remaining functions of the RLC layer and functions of a protocol layer below the RLC layer are configured on the DU. In another design, functions of the CU or the DU may alternatively be obtained through division based on a service type or another system requirement. For example, division is performed based on a delay. Functions whose processing time needs to meet a delay requirement are configured on the DU, and functions that do not need to meet the delay requirement are configured on the CU. A network architecture shown in FIG. 2 may be used for a 5G communication system, and may alternatively share one or more components or resources with an LTE system. In another design, the CU may alternatively have one or more functions of a core network. One or more CUs may be disposed in a centralized manner or a separated manner. For example, the CU may be disposed on a network side to facilitate centralized management. The DU may have a plurality of radio frequency functions, and the radio frequency functions may be remotely set.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function. The network device includes but is not limited to: an evolved NodeB (NodeB or eNB or e-NodeB, evolutional Node B) in LTE, a base station (gNodeB or gNB) or a transmission reception point (TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. The network device may alternatively be a radio controller, a CU, and/or a DU in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with the terminal device through a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The terminal is a device having a wireless transceiver function, and may be deployed on land, including an indoor or outdoor device, a hand-held device, a wearable device, or a vehicle-mounted device; may be deployed on a water surface (for example, on a ship); or may be deployed in the air (for example, on an airplane, a balloon, or a satellite). The terminal may be a mobile phone (mobile phone), a tablet computer (Pad), a computer with a wireless transceiver function, a virtual reality (virtual reality, VR) terminal device, an augmented reality (AR) terminal device, a wireless terminal in industrial control, a vehicle-mounted terminal device, a wireless terminal in self-driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal sometimes may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or mobile.

In a wireless communication network, for example, in long term evolution (LTE) or new radio (NR), to meet a requirement of a larger peak rate, a higher transmission bandwidth needs to be provided. Because a high-bandwidth continuous spectrum is scarce, carrier aggregation (CA) becomes a solution to provide a higher transmission bandwidth. CA is to aggregate two or more component carriers (CC) together to support a higher transmission bandwidth. The CC may be generally classified into a primary component carrier (PCC) and a secondary component carrier (SCC). The PCC may also be referred to as a primary component carrier or a primary cell (PCell), and the SCC may also be referred to as a secondary component carrier or a secondary cell (SCell).

Considering power consumption of the terminal, CA provides a mechanism for activating and deactivating the secondary component carrier, so that the secondary component carrier is activated when the terminal requires a higher transmission bandwidth and the secondary component carrier is deactivated when the terminal does not require a higher transmission bandwidth to save power. The network device may learn, by using information reported by the terminal, whether the secondary component carrier of the terminal has been activated. For example, the terminal reports a channel state information (CSI) report of the secondary component carrier to the network device, and the network device may learn, by using the CSI report, that the secondary component carrier of the terminal has been activated.

A mechanism for activating the secondary component carrier may be implemented by using a media access control control element (media access control control element, MAC CE). However, because processing time of the MAC CE is relatively long, it takes relatively long time to activate the secondary component carrier, and a requirement of a high-bandwidth service cannot be quickly met. Consequently, how to activate the secondary component carrier more quickly becomes an urgent problem to be resolved.

According to the method provided in the embodiments of this application, a CSI operation of a to-be-activated secondary component carrier is triggered by using physical layer signaling, so that the secondary component carrier is more quickly activated, thereby reducing time for activating the secondary component carrier, and further meeting a delay requirement of a service.

The following describes the technical solutions of this application in detail by using specific embodiments with reference to the accompanying drawings. The following embodiments and implementations may be combined with each other, and same or similar concepts or processes may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

For ease of understanding of the embodiments of this application, some concepts or terms used in this application are first briefly described.

The CSI in this application may be understood as information representing a channel state. The CSI may include one or more of the following: a channel quality indicator (channel quality indicator, CQI), a precoding matrix indication (PMI), a rank indicator (RI), a channel state information reference signal (CSI-RS) resource indicator (CRI), a channel state information interference measurement (CSI-IM) resource indicator, a synchronization signal block resource indicator (SSBRI), a layer indicator (LI), reference signal received power (RSRP), a received signal strength indicator (RSSI), reference signal received quality (RSRQ), a signal-to-noise ratio (SNR), or a signal-to-interference-plus-noise ratio (SINR).

The CSI-RS in this application is a reference signal used for CSI measurement. The network device sends the CSI-RS, and the terminal may obtain CSI by measuring the CSI-RS. The CSI may be understood as CSI between the network device and the terminal.

Aperiodic CSI measurement in this application may be understood as one or more times of CSI measurement triggered by using signaling. For example, the terminal may receive downlink control information (DCI) used to trigger aperiodic CSI measurement, and perform one or more times of measurement on the CSI-RS. The CSI-RS may be periodic, aperiodic, or semi-persistent.

Aperiodic CSI reporting in this application may be understood as one or more times of CSI reporting triggered by using signaling. For example, the terminal may receive DCI used to trigger aperiodic CSI reporting, and report (for example, to the network device) a measurement result (for example, a measurement result obtained through aperiodic CSI measurement, semi-persistent CSI measurement, or periodic measurement) for one or more times. A measurement result obtained through aperiodic CSI reporting may also be referred to as an aperiodic CSI report.

It may be understood that the DCI used to trigger aperiodic CSI measurement and the DCI used to trigger aperiodic CSI reporting may be the same DCI, or may be different DCI.

Semi-persistent CSI measurement in this application may be understood as at least one time of CSI measurement triggered by using signaling in a period of time. For example, the terminal may receive DCI used to trigger semi-persistent CSI measurement, and measure a CSI-RS at least once in a period of time. The CSI-RS may be periodic or semi-persistent.

Semi-persistent CSI reporting in this application may be understood as at least one time of CSI reporting triggered by using signaling in a period of time. For example, the terminal may receive DCI used to trigger semi-persistent CSI reporting, and report (for example, to the network device) a measurement result (for example, a measurement result obtained through semi-persistent CSI measurement or periodic measurement) at least once within a period of time. A measurement result obtained through semi-persistent CSI reporting may also be referred to as a semi-persistent CSI report.

Figure 3:
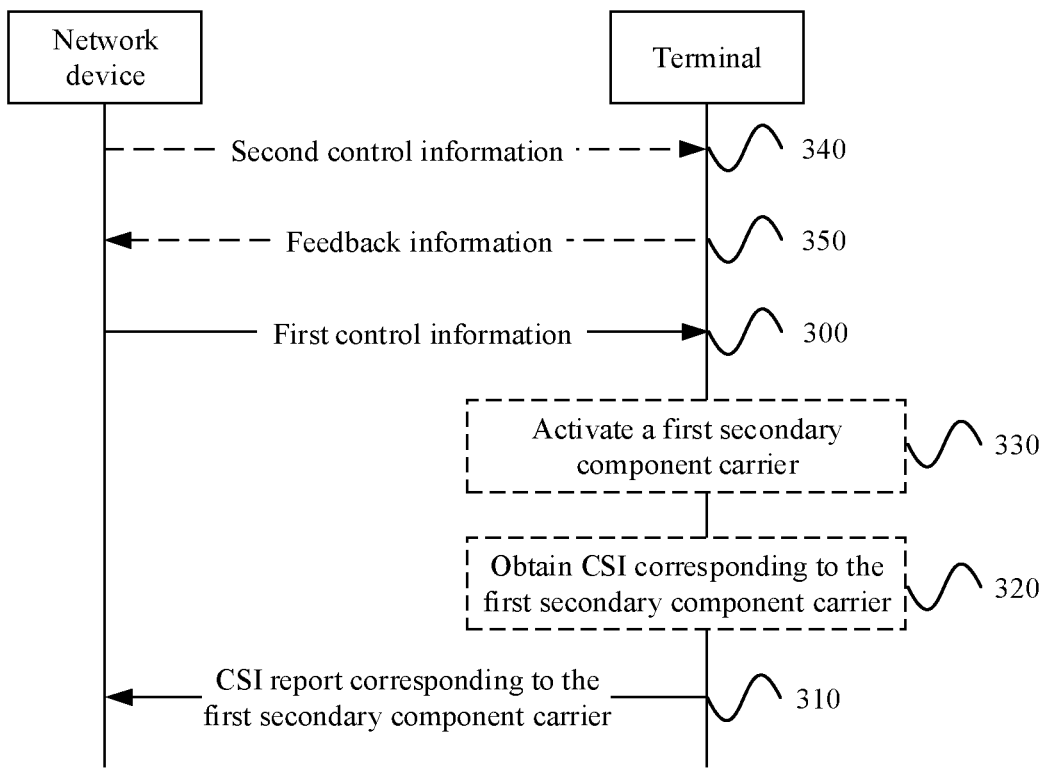
FIG. 3 is a schematic interaction diagram of a communication method according to an embodiment of this application.

FIG. 3 is a schematic interaction diagram of a communication method according to an embodiment of this application. As shown in FIG. 3, the method in this embodiment may include part 300 and part 310.

Part 300: A network device sends first control information, and a terminal receives the first control information. The first control information includes CSI request information corresponding to a first secondary component carrier, and the first secondary component carrier is in a deactivated state. The first control information is used to trigger the terminal to perform CSI reporting corresponding to the first secondary component carrier. This may also be understood as that the CSI request information included in the first control information is used to trigger the terminal to perform the CSI reporting corresponding to the first secondary component carrier. The CSI reporting may be aperiodic CSI reporting, or may be semi-persistent CSI reporting. Optionally, the first control information is uplink or downlink DCI, and the DCI is carried by a physical downlink control channel (PDCCH). The DCI in this application may also be understood as physical layer signaling. Optionally, the terminal receives the first control information on a primary component carrier and/or an activated secondary component carrier, where the activated secondary component carrier is different from the first secondary component carrier.

Part 310: The terminal reports, based on the first control information, a CSI report corresponding to the first secondary component carrier, and the network device receives the CSI report, where the CSI report is an aperiodic CSI report or a semi-persistent CSI report. It may be understood that the CSI report in this application may also be referred to as a valid CSI report. That the terminal reports the CSI report corresponding to the first secondary component carrier may also be understood as that the terminal performs CSI reporting corresponding to the first secondary component carrier. The CSI reporting may be aperiodic CSI reporting or semi-persistent CSI reporting. The CSI report that is reported by the terminal and that corresponds to the first secondary component carrier may be carried by a physical uplink shared channel (physical uplink shared channel, PUSCH).

In this application, CSI corresponding to the first secondary component carrier may be understood as CSI on the first secondary component carrier. The terminal may obtain the CSI on the first secondary component carrier (which may also be referred to as the CSI corresponding to the first secondary component carrier) by measuring a CSI-RS on the first secondary component carrier. Performing the CSI reporting corresponding to the first secondary component carrier or reporting the CSI report corresponding to the first secondary component carrier may be understood as reporting the CSI on the first secondary component carrier.

There may be one or more first secondary component carriers. For ease of description, this application uses a singular number as an example for description.

According to the foregoing method, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

In part 310, optionally, the network device receives the CSI report based on the first control information. The first control information may include first uplink resource indication information, and the first uplink resource indication information indicates a resource used for reporting the CSI report. The terminal reports, on the resource, the CSI report corresponding to the first secondary component carrier, and the network device receives, on the resource, the CSI report corresponding to the first secondary component carrier from the terminal.

The resource in this application may be understood as a physical resource. The physical resource may include one or more of a time domain resource, a frequency domain resource, a code domain resource, or a space domain resource. For example, the time domain resource included in the physical resource may include at least one frame, at least one subframe, at least one slot, at least one mini-slot, or at least one time domain symbol. For example, the frequency domain resource included in the physical resource may include at least one carrier, at least one CC, at least one bandwidth part (BWP), at least one resource block group (RBG), at least one physical resource block group (PRG), at least one resource block (RB), at least one subcarrier (SC), or the like. For example, the space domain resource included in the physical resource may include at least one beam, at least one port, at least one antenna port, at least one layer/space layer, or the like. For example, the code domain resource included in the physical resource may include at least one orthogonal cover code (OCC), at least one non-orthogonal multiple access (NOMA) code, or the like. It may be understood that the physical resource may be a physical resource of a baseband, and the physical resource of the baseband may be used by a baseband chip. Alternatively, the physical resource may be a physical resource of an air interface. Alternatively, the physical resource may be a physical resource of an intermediate frequency or a radio frequency.

Optionally, the communication method provided in this embodiment of this application shown in FIG. 3 may further include part 320: The terminal obtains the CSI corresponding to the first secondary component carrier. The terminal may obtain the CSI corresponding to the first secondary component carrier by measuring the CSI-RS on the first secondary component carrier. The measurement on the CSI-RS may also be referred to as CSI measurement, and the CSI measurement may be aperiodic CSI measurement, semi-persistent CSI measurement, or periodic CSI measurement.

In a possible implementation of part 320, the terminal performs, based on the first control information, the CSI measurement corresponding to the first secondary component carrier. The first control information may be further used to trigger the terminal to perform the CSI measurement corresponding to the first secondary component carrier. Optionally, the first control information may include first CSI-RS resource indication information, and the first CSI-RS resource indication information indicates a resource used by the CSI-RS on the first secondary component carrier. The terminal obtains the CSI corresponding to the first secondary component carrier by measuring the CSI-RS on the resource, where the CSI-RS may be periodic, aperiodic, or semi-persistent.

In another possible implementation of part 320, the terminal performs, based on higher layer signaling (for example, RRC signaling), the CSI measurement corresponding to the first secondary component carrier. Optionally, the higher layer signaling may include first CSI-RS resource configuration information, and the first CSI-RS resource configuration information is used to configure a resource used by the CSI-RS on the first secondary component carrier. The terminal obtains the CSI corresponding to the first secondary component carrier by measuring the CSI-RS on the resource.

In another possible implementation of part 320, the terminal performs, based on higher layer signaling (for example, RRC signaling) and DCI, CSI measurement corresponding to the first secondary component carrier, where the DCI may be the first control information, or may be uplink or downlink control information different from the first control information. The higher layer signaling may include first CSI-RS resource set configuration information, and the first CSI-RS resource set configuration information is used to configure candidate resources used by the CSI-RS on the first secondary component carrier. The DCI indicates one or more resources in the foregoing candidate resources, and the terminal obtains the CSI corresponding to the first secondary component carrier by measuring the CSI-RS on the one or more resources.

In an optional implementation of the first control information, the first control information may be further used to trigger to activate the first secondary component carrier. Optionally, the communication method provided in this embodiment of this application shown in FIG. 3 may further include part 330: The terminal activates the first secondary component carrier. In a possible implementation of part 330, if the terminal determines that the first secondary component carrier is in a deactivated state, the terminal activates the first secondary component carrier. Optionally, in part 310, when receiving the CSI report corresponding to the first secondary component carrier, the network device determines that the first secondary component carrier of the terminal is in an activated state. In this implementation, the first control information can not only be used to trigger the terminal to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

In a possible implementation provided in this embodiment of this application shown in FIG. 3, that the first control information includes CSI request information corresponding to the first secondary component carrier may also be understood that the first control information includes CSI request information corresponding to a BWP of the first secondary component carrier. The first control information is used to trigger the terminal to perform CSI reporting corresponding to the BWP of the first secondary component carrier. This may also be understood that the CSI request information that is included in the first control information and that corresponds to the BWP of the first secondary component carrier is used to trigger the terminal to perform the CSI reporting corresponding to the BWP of the first secondary component carrier. The BWP is a first active BWP. The first active BWP may also be referred to as a first default BWP, a first active BWP of the first secondary component carrier, or a first default BWP of the first secondary component carrier, and may be configured by using higher layer signaling (for example, RRC signaling). When the terminal activates the first secondary component carrier, the first active BWP is activated (this may also be understood as that the first active BWP is first activated). The terminal may monitor a control channel in the BWP, or may perform data transmission with the network device in the BWP.

In this application, CSI corresponding to the BWP of the first secondary component carrier may be understood as CSI in the BWP of the first secondary component carrier. The terminal may obtain the CSI in the BWP of the first secondary component carrier (which may also be referred to as the CSI corresponding to the BWP of the first secondary component carrier) by measuring a CSI-RS in the BWP of the first secondary component carrier. Performing the CSI reporting corresponding to the BWP of the first secondary component carrier, or reporting a CSI report corresponding to the BWP of the first secondary component carrier may be understood as reporting the CSI in the BWP of the first secondary component carrier.

With reference to the foregoing implementation, in part 310, optionally, the terminal reports, based on the first control information, the CSI report corresponding to the BWP of the first secondary component carrier, and the network device receives the CSI report. That the terminal reports the CSI report corresponding to the BWP of the first secondary component carrier may also be understood as that the terminal performs the CSI reporting corresponding to the BWP of the first secondary component carrier. The CSI report that is reported by the terminal and that corresponds to the BWP of the first secondary component carrier may be carried by a PUSCH.

With reference to the foregoing implementation, in part 310, optionally, the network device receives, based on the first control information, the CSI report corresponding to the BWP of the first secondary component carrier. The first control information may include second uplink resource indication information, and the second uplink resource indication information indicates a resource used for reporting the CSI report. The terminal reports, on the resource, the CSI report corresponding to the BWP of the first secondary component carrier, and the network device receives, on the resource, the CSI report corresponding to the BWP of the first secondary component carrier from the terminal.

With reference to the foregoing implementation, in part 320, optionally, the terminal obtains the CSI corresponding to the BWP of the first secondary component carrier. The terminal may obtain the CSI corresponding to the BWP of the first secondary component carrier by measuring the CSI-RS in the BWP of the first secondary component carrier.

With reference to the foregoing implementation, in an optional implementation method of part 320, the terminal performs, based on the first control information, CSI measurement corresponding to the BWP of the first secondary component carrier. The first control information may be further used to trigger the terminal to perform the CSI measurement corresponding to the BWP of the first secondary component carrier. Optionally, the first control information may include second CSI-RS resource indication information, and the second CSI-RS resource indication information indicates a resource used by the CSI-RS in the BWP of the first secondary component carrier. The terminal obtains the CSI corresponding to the BWP of the first secondary component carrier by measuring the CSI-RS on the resource. The CSI-RS may be periodic, aperiodic, or semi-persistent.

With reference to the foregoing implementation, in another optional implementation method of part 320, the terminal performs, based on higher layer signaling (for example, RRC signaling), CSI measurement corresponding to the BWP of the first secondary component carrier. Optionally, the higher layer signaling may include second CSI-RS resource configuration information, and the second CSI-RS resource configuration information is used to configure a resource used by the CSI-RS in the BWP of the first secondary component carrier. The terminal obtains the CSI corresponding to the BWP of the first secondary component carrier by measuring the CSI-RS on the resource.

With reference to the foregoing implementation, in another possible implementation of part 320, the terminal performs, based on higher layer signaling (for example, RRC signaling) and DCI, CSI measurement corresponding to the BWP of the first secondary component carrier, where the DCI may be the first control information, or may be uplink or downlink control information different from the first control information. The higher layer signaling may include second CSI-RS resource set configuration information, and the second CSI-RS resource set configuration information is used to configure candidate resources used by the CSI-RS in the BWP of the first secondary component carrier. The DCI indicates one or more resources in the foregoing candidate resources, and the terminal obtains the CSI corresponding to the BWP of the first secondary component carrier by measuring the CSI-RS on the one or more resources.

With reference to the foregoing implementation, in an implementation method in which the first control information may be further used to trigger to activate the first secondary component carrier, optionally, in part 330, the terminal determines that the first secondary component carrier is in a deactivated state, and determines that the BWP is a first active BWP. In this case, the terminal activates the first secondary component carrier. Further, optionally, the terminal may further activate the first active BWP on the first secondary component carrier. Optionally, in part 310, when receiving the CSI report corresponding to the BWP of the first secondary component carrier, the network device determines that the first secondary component carrier of the terminal is in an activated state. Further, optionally, the network device may further determine that the first active BWP of the terminal is in an activated state. In this optional method, the first control information can not only be used to trigger the terminal to perform CSI reporting corresponding to a BWP of a to-be-activated first secondary component carrier, but also be used to trigger to activate the first secondary component carrier. Therefore, not only time required for a secondary component carrier activation procedure can be reduced, but also signaling overheads can be further reduced. The CSI reporting may be semi-persistent CSI reporting or aperiodic CSI reporting.

An execution sequence of part 320 and part 330 in FIG. 3 is not limited in this application. Part 330 may be first performed, and then part 320 may be performed. Alternatively, part 320 may be first performed, and then part 330 may be performed. Alternatively, part 330 and part 320 may be simultaneously performed.

In another optional implementation of the first control information, the first control information further includes uplink shared channel (uplink shared channel, UL-SCH) indication information, and the UL-SCH indication information indicates whether a PUSCH carries a UL-SCH. The PUSCH is a PUSCH that carries a CSI report corresponding to the first secondary component carrier, or the PUSCH is a PUSCH that carries a CSI report corresponding to a BWP of the first secondary component carrier.

When the UL-SCH indication information indicates that the PUSCH carries the UL-SCH, in part 310, the terminal reports, based on the first control information, the CSI report corresponding to the first secondary component carrier. The first control information further includes first uplink resource indication information, the first uplink resource indication information indicates a resource used for reporting the CSI report, and the resource is included in the PUSCH. The terminal reports the CSI report on the resource, and the network device receives the CSI report on the resource. It may be understood that the CSI report may alternatively be a CSI report corresponding to the BWP of the first secondary component carrier, and the BWP is a first active BWP.

When the UL-SCH indication information indicates that the PUSCH does not carry the UL-SCH, in part 310, the terminal reports, based on higher layer signaling (for example, RRC signaling), the CSI report corresponding to the first secondary component carrier. The higher layer signaling may include reporting resource configuration information. The reporting resource configuration information configures a resource used for reporting the CSI report, and the resource is included in the PUSCH. The terminal reports the CSI report on the resource, and the network device receives the CSI report on the resource. It may be understood that the CSI report may alternatively be a CSI report corresponding to the BWP of the first secondary component carrier, and the BWP is a first active BWP.

Optionally, the communication method provided in this embodiment of this application shown in FIG. 3 may further include part 340: The network device sends second control information, and the terminal receives the second control information. The second control information includes trigger activation information corresponding to the first secondary component carrier. The second control information is used to trigger to activate the first secondary component carrier. This may also be understood as that the trigger activation information that is included in the second control information and that corresponds to the first secondary component carrier is used to trigger to activate the first secondary component carrier. In part 330, optionally, the terminal activates the first secondary component carrier based on the second control information.

It may be understood that a carrier carrying the first control information and a carrier carrying the second control information may be the same or different. For example, the carrier carrying the first control information is a primary component carrier, and the carrier carrying the second control information is also the primary component carrier. Alternatively, the carrier carrying the first control information is a secondary component carrier in an activated state, and the carrier carrying the second control information is also the secondary component carrier in the activated state. Alternatively, the carrier carrying the first control information is a primary component carrier, and the carrier carrying the second control information is a secondary component carrier in an activated state. Alternatively, the carrier carrying the first control information is a secondary component carrier in an activated state, and the carrier carrying the second control information is a primary component carrier.

In a possible implementation of the second control information, the second control information is carried by a MAC CE.

Figure 4A:
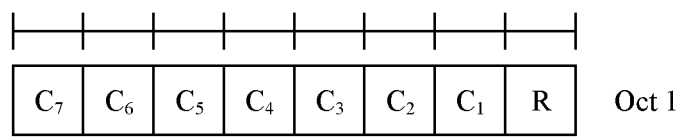
FIG. 4A is a schematic diagram of a MAC CE according to an embodiment of this application.

For example, the second control information may be carried in a MAC CE format shown in FIG. 4A. The MAC CE format shown in FIG. 4A includes eight bits: R, $C_1$, $C_2$, $C_3$, $C_4$, $C_5$, $C_6$, and $C_7$. The bit R is a reserved bit, and the bit $C_1$ (i=1, 2, . . . , and 7) indicates to activate or deactivate a secondary component carrier i. For example, if the bit $C_1$ is 1, it indicates that the secondary component carrier i is to be activated, and if the bit $C_1$ is 0, it indicates that the secondary component carrier i is to be deactivated. Alternatively, if the bit $C_1$ is 0, it indicates that the secondary component carrier i is to be activated, and if the bit $C_1$ is 1, it indicates that the secondary component carrier i is to be deactivated. The trigger activation information corresponding to the first secondary component carrier may be understood as a bit $C_1$ (i=1, 2, . . . , and 7) corresponding to the first secondary component carrier. For example, if the first secondary component carrier is a secondary component carrier 1, the trigger activation information corresponding to the first secondary component carrier may be understood as a bit $C_1$. For another example, if the first secondary component carrier is a secondary component carrier 1 and a secondary component carrier 2, the trigger activation information corresponding to the first secondary component carrier may be understood as a bit $C_1$ and a bit $C_2$.

Figure 4B:
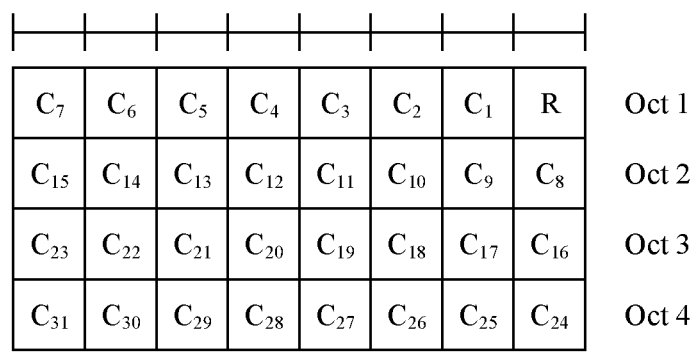
FIG. 4B is a schematic diagram of another MAC CE according to an embodiment of this application.

For another example, the second control information may be carried in a MAC CE format shown in FIG. 4B. The MAC CE format shown in FIG. 4B includes 32 bits: R, and $C_1$ (i=1, 2, . . . , and 31). The bit R is a reserved bit, and the bit $C_1$ (i=1, 2, . . . , and 31) indicates to activate or deactivate a secondary component carrier i. For example, if the bit $C_1$ is 1, it indicates that the secondary component carrier i is to be activated, and if the bit $C_1$ is 0, it indicates that the secondary component carrier i is to be deactivated. Alternatively, if the bit $C_1$ is 0, it indicates that the secondary component carrier i is to be activated, and if the bit $C_1$ is 1, it indicates that the secondary component carrier i is to be deactivated. The trigger activation information corresponding to the first secondary component carrier may be understood as a bit $C_1$ (i=1, 2, . . . , and 31) corresponding to the first secondary component carrier. For example, if the first secondary component carrier is a secondary component carrier 1, the trigger activation information corresponding to the first secondary component carrier may be understood as a bit $C_1$. For another example, if the first secondary component carrier is a secondary component carrier 1 and a secondary component carrier 2, the trigger activation information corresponding to the first secondary component carrier may be understood as a bit $C_1$ and a bit $C_2$.

It may be understood that an execution sequence of part 300 and part 340 is not limited in this embodiment of this application shown in FIG. 3. For example, part 300 may be first performed, and then part 340 may be performed. Alternatively, part 340 may be first performed, and then part 300 may be performed. Alternatively, part 300 and part 340 may be simultaneously performed.

In a possible implementation in which part 300 is first performed and then part 340 is performed, after receiving the first control information and before receiving the second control information, the terminal performs, based on the first control information, CSI measurement corresponding to the first secondary component carrier. After the terminal receives the second control information, that the terminal performs CSI reporting corresponding to the first secondary component carrier may also be understood as that the terminal reports a CSI measurement result corresponding to the first secondary component carrier to the network device. Correspondingly, after sending the second control information to the terminal, the network device receives a CSI report corresponding to the first secondary component carrier from the terminal, where the CSI report includes the CSI measurement result corresponding to the first secondary component carrier. It may be understood that the CSI measurement corresponding to the first secondary component carrier may alternatively be CSI measurement corresponding to a BWP of the first secondary component carrier, the CSI reporting corresponding to the first secondary component carrier may alternatively be CSI reporting corresponding to the BWP of the first secondary component carrier, the CSI report corresponding to the first secondary component carrier may alternatively be a CSI report corresponding to the BWP of the first secondary component carrier, and the CSI measurement result corresponding to the first secondary component carrier may alternatively be a CSI measurement result corresponding to the BWP of the first secondary component carrier, where the BWP is a first active BWP.

In a possible implementation in which part 300 and part 340 are simultaneously performed, the network device simultaneously performs part 300 and part 340, that is, simultaneously sends the first control information and the second control information. When the first control information is carried by the PDCCH and the second control information is carried by the MAC CE, because time for processing the MAC CE is usually longer than time for processing the PDCCH, the terminal first obtains the first control information and then obtains the second control information. After obtaining the first control information and before obtaining the second control information, the terminal performs, based on the first control information, CSI measurement corresponding to the first secondary component carrier. After the terminal obtains the second control information, that the terminal performs CSI reporting corresponding to the first secondary component carrier may also be understood as that the terminal reports a CSI measurement result corresponding to the first secondary component carrier to the network device. It may be understood that the CSI measurement corresponding to the first secondary component carrier may alternatively be CSI measurement corresponding to a BWP of the first secondary component carrier, the CSI reporting corresponding to the first secondary component carrier may alternatively be CSI reporting corresponding to the BWP of the first secondary component carrier, and the CSI measurement result corresponding to the first secondary component carrier may alternatively be a CSI measurement result corresponding to the BWP of the first secondary component carrier, where the BWP is a first active BWP.

In a possible implementation in which part 340 is first performed and then part 300 is performed, after receiving the second control information and before receiving the first control information, the terminal performs part 330 (the terminal activates the first secondary component carrier). Alternatively, after receiving the second control information and after receiving the first control information, the terminal performs part 330 (the terminal activates the first secondary component carrier). Alternatively, after receiving the second control information and when receiving the first control information, the terminal performs part 330 (the terminal activates the first secondary component carrier).

In another possible implementation in which part 340 is first performed and then part 300 is performed, the communication method provided in this embodiment of this application shown in FIG. 3 may further include part 350: Before receiving the first control information, the terminal sends feedback information corresponding to the second control information. Before sending the first control information, the network device receives the feedback information corresponding to the second control information. Optionally, the feedback information is acknowledgment (acknowledgement, ACK) information, and the ACK information may be understood as information fed back by the terminal to the network device after the terminal correctly receives the second control information, to notify the network device that the second control information is correctly received. Optionally, that the terminal does not blindly detect or receive the first control information before sending the feedback information may also be understood as that the terminal blindly detects or receives the control information only after sending the feedback information, to reduce power consumption of the terminal.

It may be understood that in an implementation in which the second control information is used to trigger to activate the first secondary component carrier, an execution sequence of part 300 and part 330 and an execution sequence of part 350 and part 330 are not limited in this embodiment of this application shown in FIG. 3.

In the communication method provided in this embodiment of this application shown in FIG. 3, optionally, the terminal may further send feedback information corresponding to the first control information, and the network device receives the feedback information. In a possible implementation, if the terminal successfully receives the first control information, the feedback information is acknowledgment (ACK) information. In another possible implementation, if the terminal does not successfully receive the first control information, the feedback information is negative acknowledgment (NACK) information. The foregoing implementation enables the network device to learn, more quickly, of a status of receiving the first control information by the terminal, so that the network device can learn, more quickly, of an activation status of the secondary component carrier, thereby reducing time required for a secondary component carrier activation procedure.

Figure 5:
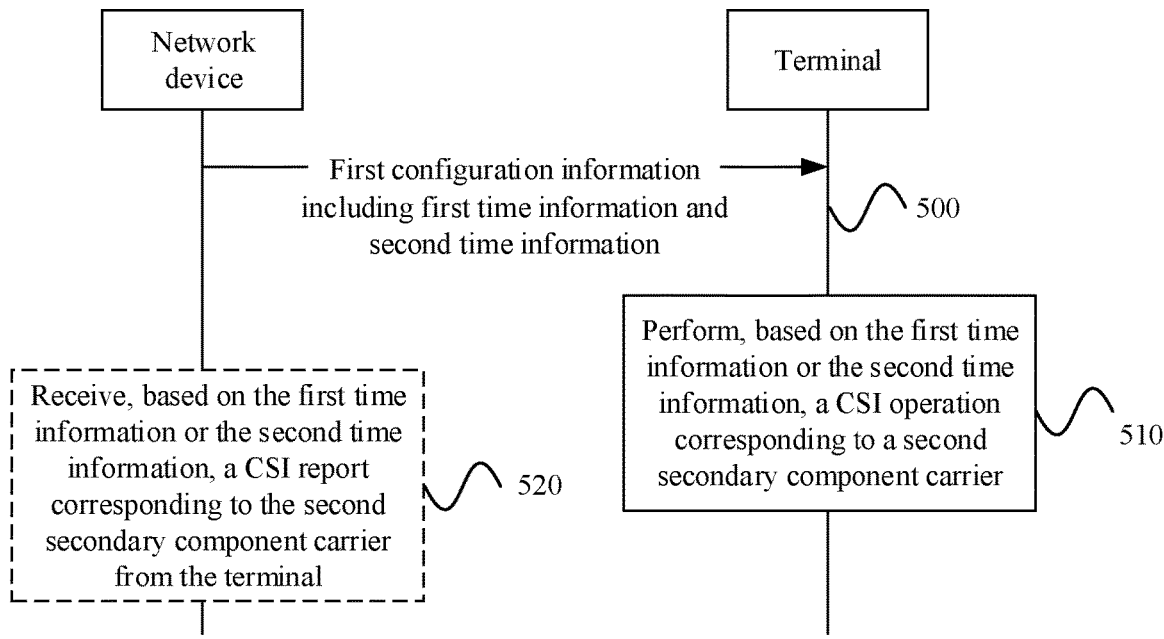
FIG. 5 is a schematic interaction diagram of another communication method according to an embodiment of this application.

FIG. 5 is a schematic interaction diagram of another communication method according to an embodiment of this application. As shown in FIG. 5, the method in this embodiment may include part 500 and part 510.

Part 500: A network device sends first configuration information, and a terminal receives the first configuration information. The first configuration information includes first time information and second time information. Optionally, the first configuration information is carried by higher layer signaling (for example, RRC signaling).

Part 510: The terminal performs, based on the first time information or the second time information, a CSI operation corresponding to a second secondary component carrier, or the terminal performs, based on the first time information or the second time information, a CSI operation corresponding to a BWP of the second secondary component carrier. The CSI operation includes one or more of the following: aperiodic CSI reporting, aperiodic CSI measurement, semi-persistent CSI reporting, semi-persistent CSI measurement, or periodic measurement.

Optionally, the communication method provided in this embodiment of this application shown in FIG. 5 may further include part 520: The network device receives, based on the first time information or the second time information, a CSI report corresponding to the second secondary component carrier from the terminal, or the network device receives, based on the first time information or the second time information, a CSI report corresponding to a BWP of the second secondary component carrier from the terminal, where the BWP is a first active BWP. The CSI report is an aperiodic CSI report or a semi-persistent CSI report.

In a possible implementation of part 510, the terminal determines, based on an activation status of the second secondary component carrier, to use the first time information or the second time information to perform the CSI operation corresponding to the second secondary component carrier (which may also be understood as performing a CSI operation corresponding to the BWP of the second secondary component carrier). When the second secondary component carrier is in an activated state, the CSI operation corresponding to the second secondary component carrier is performed based on the first time information (which may also be understood as that the CSI operation corresponding to the BWP of the second secondary component carrier is performed, where the BWP is a BWP configured by using higher layer signaling (for example, RRC signaling)). When the second secondary component carrier is in a deactivated state, the CSI operation corresponding to the second secondary component carrier is performed based on the second time information (which may also be understood as that the CSI operation corresponding to the BWP of the second secondary component carrier is performed, where the BWP is a first active BWP).

In a possible implementation in which the CSI operation is aperiodic CSI measurement, semi-persistent CSI measurement, or periodic measurement, the first time information indicates a time domain resource that is used to perform CSI measurement corresponding to the second secondary component carrier (which may also be understood as that CSI measurement corresponding to the BWP of the second secondary component carrier is performed) and that is used when the second secondary component carrier is in an activated state, and the second time information indicates a time domain resource that is used to perform CSI measurement corresponding to the second secondary component carrier (which may also be understood as that CSI measurement corresponding to the BWP of the second secondary component carrier is performed, where the BWP is a first active BWP) and that is used when the second secondary component carrier is in a deactivated state.

For example, the terminal receives, in a slot n, information used to trigger CSI reporting corresponding to the second secondary component carrier (which may also be understood as CSI reporting corresponding to the BWP of the second secondary component carrier), where the information may be, for example, the first control information shown in FIG. 3. The first time information indicates that when the second secondary component carrier is in the activated state, the time domain resource used to perform the CSI measurement corresponding to the second secondary component carrier is a slot n+X1. The second time information indicates that when the second secondary component carrier is in the deactivated state, the time domain resource used to perform the CSI measurement corresponding to the second secondary component carrier is a slot n+X2. X1 and X2 are non-negative integers, and X1 and X2 may be equal or not equal. In an optional manner, X1 is less than X2. This is because it is considered that a deactivated secondary component carrier needs more time to receive a CSI-RS. Optionally, the first time information and the second time information may be shown in Table 1, where aperiodicTriggeringOffset is the first time information, indicating X1, and a value of X1 is an integer from 0 to 6; and aperiodicTriggeringOffsetforactivation is the second time information, indicating X2, and a value of X2 is an integer from 4 to 16. It may be understood that, in this example, values and names of the first time information and the second time information are merely examples. In this embodiment of this application, another value and another name of the first time information and the second time information may also be supported.

In the foregoing implementation, time information of the CSI measurement can be properly configured based on an activation status of a secondary component carrier, so that time requirements of different secondary component carrier types for the CSI measurement can be met, thereby improving CSI measurement efficiency in a CA scenario.

The second secondary component carrier in the deactivated state may be further classified into a first-type deactivated secondary component carrier and a second-type deactivated secondary component carrier. The first-type deactivated secondary component carrier may also be referred to as a known (known) secondary component carrier or a known (known) cell, and the second-type deactivated secondary component carrier may also be referred to as an unknown (unknown) secondary component carrier or an unknown (unknown) cell. Time required for activating the second-type deactivated secondary component carrier is longer than time required for activating the first-type deactivated secondary component carrier. In an optional implementation, the second time information indicates that a time domain resource used to perform CSI measurement corresponding to the first-type deactivated secondary component carrier (which may also be understood as that CSI measurement corresponding to a BWP of the first-type deactivated secondary component carrier is performed, where the BWP is a first active BWP) is a slot n+X21, and the second time information indicates that a time domain resource used to perform CSI measurement corresponding to the second-type deactivated secondary component carrier (which may also be understood as that CSI measurement corresponding to a BWP of the second-type deactivated secondary component carrier is performed, where the BWP is the first active BWP) is a slot n+X22, where X21 is less than X22. In this implementation, time requirements of different types of deactivated carriers for CSI measurement can be met. The CSI measurement is aperiodic CSI-RS measurement, semi-persistent CSI measurement, or periodic CSI-RS measurement.

In a possible implementation in which the CSI operation is aperiodic CSI reporting or semi-persistent CSI reporting, the first time information indicates a time domain resource that is used to perform CSI reporting corresponding to the second secondary component carrier (which may also be understood as that CSI reporting corresponding to the BWP of the second secondary component carrier is performed) and that is used when the second secondary component carrier is in an activated state, and the second time information indicates a time domain resource that is used to perform CSI reporting corresponding to the second secondary component carrier (which may also be understood as that CSI reporting corresponding to the BWP of the second secondary component carrier is performed, where the BWP is a first active BWP) and that is used when the second secondary component carrier is in a deactivated state.

For example, the terminal receives, in a slot n, information used to trigger CSI reporting corresponding to the

TABLE 1

| | |
|---|---|
| NZP-CSI-RS-ResourceSet ::= | SEQUENCE { |
| ... | |
| aperiodicTriggeringOffset<br>OPTIONAL, -- Need S | INTEGER(0..6) |
| aperiodicTriggeringOffsetforactivation<br>OPTIONAL, -- Need S | INTEGER(4..16) |
| ... | |
| } | | second secondary component carrier (which may also be understood as CSI reporting corresponding to the BWP of the second secondary component carrier), where the information may be, for example, the first control information shown in FIG. 3. The first time information indicates that when the second secondary component carrier is in the activated state, the time domain resource used to perform the CSI reporting corresponding to the second secondary component carrier is a slot n+Y1. The second time information indicates that when the second secondary component carrier is in the deactivated state, the time domain resource used to perform the CSI reporting corresponding to the second secondary component carrier is a slot n+Y2. Y1 and Y2 are non-negative integers, and Y1 and Y2 may be equal or not equal. In an optional manner, Y1 is less than Y2. This is because it is considered that a deactivated secondary component carrier needs more time to perform CSI reporting. Optionally, the first time information and the second time information may be shown in Table 2, where CSI-Report-Config may be understood as the foregoing first configuration information, used to configure a CSI reporting parameter; reportSlotOffsetList is the first time information, indicating Y1, and a value of Y1 is one or more integers from 0 to 32; and reportSlotOffsetListforactivation is the second time information, indicating Y2, and a value of Y2 is one or more integers from 10 to 42. Optionally, K1 (where K1 is less than or equal to maxNrofUL-Allocations1 in Table 2) candidate values of Y1 (which may be represented as $\{Y1_1, \ldots, Y1_{K1}\}$) is configured in the first time information, and K2 (where K2 is less than or equal to maxNrofUL-Allocations2 in Table 2) candidate values of Y2 (which may be represented as $\{Y2_1, \ldots, Y2_{K2}\}$) is configured in the second time information. In a possible implementation, a maximum value in $\{Y1_1, Y1_{K1}\}$ is less than a maximum value in $\{Y2_1, \ldots, Y2_{K2}\}$. This is because it is considered that a deactivated secondary component carrier needs more time to perform CSI reporting. Optionally, K1=K2, or in Table 2, maxNrofUL-Allocations1=maxNrofUL-Allocations2. In this way, when DCI can be used to indicate one value of $\{Y1_1, Y1_{K1}\}$ as Y1 or indicate one value of $\{Y2_1, \ldots, Y2_{K2}\}$ as Y2, a same quantity of bits can be used in an indication field of the DCI, thereby simplifying design of the downlink control information. It may be understood that, in this example, values and names of the first time information and the second time information are merely examples. In this embodiment of this application, another value and another name of the first time information and the second time information may also be supported.

Config1 is reportSlotOffsetList1foractivation. First time information included in the CSI-ReportConfig2 is reportSlotOffsetList2, and second time information included in the CSI-ReportConfig2 is reportSlotOffsetList2foractivation. K11 candidate values of Y1 are configured in the reportSlotOffsetList1 (which may be represented as $\{Y1_1, \ldots, Y1_{K11}\}$), and K12 candidate values of Y1 are configured in the reportSlotOffsetList2 (which may be represented as $\{Y1'_1, \ldots, Y1'_{K12}\}$). K21 candidate values of Y2 are configured in the reportSlotOffsetList1foractivation (which may be represented as $\{Y2_1, \ldots, Y2_{K21}\}$), and K22 candidate values of Y2 are configured in the reportSlotOffsetList2foractivation (which may be represented as $\{Y2'_1, \ldots, Y2'_{K22}\}$).

When DCI is used to indicate values of $\{Y1_1, \ldots, Y1_{K11}\}$ and $\{Y1'_1, \ldots, Y1'_{K12}\}$ as Y1, $Y1_i$ (where i=1, ..., or K11) in $\{Y1_1, \ldots, Y1K11\}$ and $Y1'_j$ (where j=1, ..., or K12) in $\{Y1'_1, \ldots, Y1'_{K12}\}$ may be obtained by using the indication of the DCI, where i and j may be equal or not equal, and a larger value of $Y1_i$ and $Y1'_j$ may be used as Y1, a smaller value of $Y1_i$ and $Y1'_j$ may be used as Y1, or both $Y1_i$ and $Y1'_j$ may be used as Y1 (that is, a plurality of Y1s are obtained).

When DCI is used to indicate values of $\{Y2_1, \ldots, Y2_{K21}\}$ and $\{Y2'_1, \ldots, Y2'_{K22}\}$ as Y2, $Y2_{i'}$ (where i'=1, ..., or K21) in $\{Y2_1, \ldots, Y2_{K21}\}$ and $Y2'_{j'}$ (where j'=1, ..., or K22) in $\{Y2'_1, \ldots, Y2'_{K22}\}$ may be obtained by using an indication of the DCI, where i' and j' may be equal or not equal, and a larger value of $Y2_{i'}$ and $Y2'_{j'}$ may be used as Y2, a smaller value of $Y2_{i'}$ and $Y2'_{j'}$ may be used as Y2, or both $Y2_{i'}$ and $Y2'_{j'}$ may be used as Y2 (that is, a plurality of Y2 are obtained).

For example, the terminal receives, in a slot n, information used to trigger CSI reporting corresponding to the second secondary component carrier (which may also be understood as CSI reporting corresponding to the BWP of the second secondary component carrier), where the information may be, for example, the first control information shown in FIG. 3. The first time information indicates that when the second secondary component carrier is in the activated state, the time domain resource used to perform the CSI reporting corresponding to the second secondary component carrier is a slot n+Y1. The second time information indicates that when the second secondary component carrier is in the deactivated state, the time domain resource used to perform the CSI reporting corresponding to the second secondary component carrier is a slot n+Y2. Y1 and Y2 are non-negative integers, and Y1 and Y2 may be equal or not equal. In an optional manner, Y1 is less than Y2. This is because it is considered that a deactivated secondary com-

TABLE 2

| CSI-ReportConfig ::= | SEQUENCE { |
|---|---|
| ... | |
| reportSlotOffsetList OFINTEGER(0..32) | SEQUENCE (SIZE (1..maxNrofUL-Allocations1)) |
| reportSlotOffsetListforactivation OFINTEGER(10..42) | SEQUENCE (SIZE (1..maxNrofUL-Allocations2)) |
| } | |

It may be understood that only one CSI-ReportConfig is configured in Table 2. This embodiment of this application may also be applicable to a case in which a plurality of CSI-ReportConfig are configured. For example, two CSI-ReportConfig (represented as CSI-ReportConfig1 and CSI-ReportConfig2) are configured. First time information included in the CSI-ReportConfig1 is reportSlotOffsetList1, and second time information included in the CSI-Reportponent carrier needs more time to perform CSI reporting. Optionally, the first time information and the second time information may be shown in Table 3, where k2 is the first time information, indicating Y1, and a value of Y1 is an integer from 0 to 32; and k2' is the second time information, indicating Y2, and a value of Y2 is an integer from 10 to 42. It may be understood that, in this example, values and names of the first time information and the second time information are merely examples. In this embodiment of this application, another value and another name of the first time information and the second time information may also be supported.

TABLE 3

| | | |
|---|---|---|
| PUSCH-TimeDomainResourceAllocation ::= | SEQUENCE { | |
| k2 | INTEGER(0..32) | OPTIONAL, -- Need S |
| k2' | INTEGER(10..42) | OPTIONAL, -- Need S |
| ... | | |
| } | | |

In the foregoing implementation, time information of the CSI reporting can be properly configured based on an activation status of a secondary component carrier, so that time requirements of different secondary component carrier types for the CSI reporting can be met, thereby improving CSI reporting efficiency in a CA scenario. The CSI reporting is semi-persistent CSI reporting or aperiodic CSI reporting.

It may be understood that the method shown in FIG. 5 may be implemented in combination with the method shown in FIG. 3, and the second secondary component carrier shown in FIG. 5 and the first secondary component carrier shown in FIG. 3 may be a same secondary component carrier.

Figure 6:
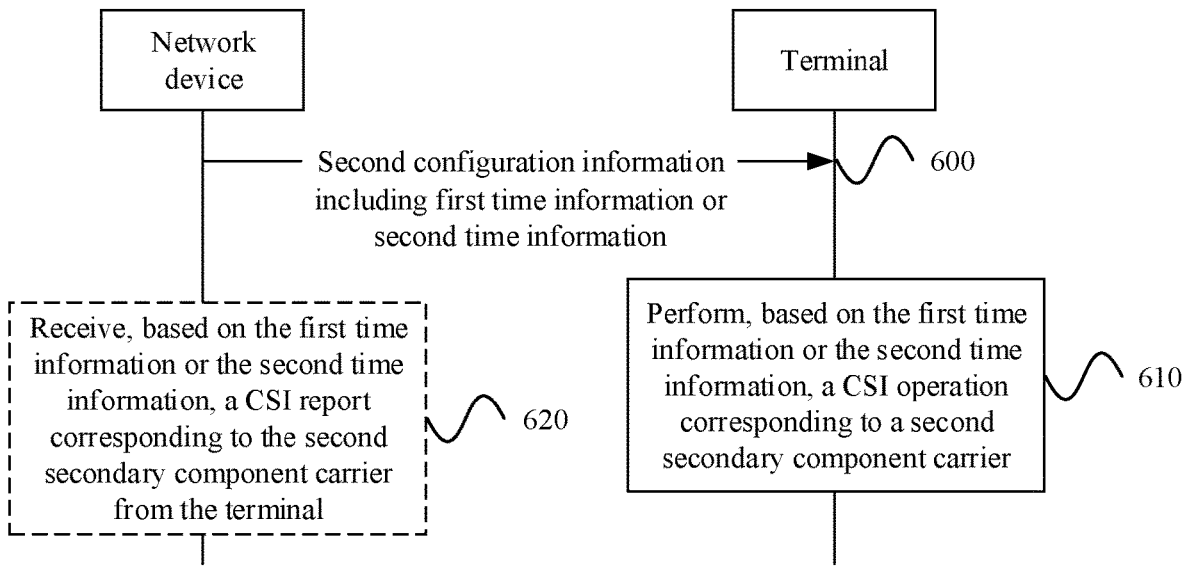
FIG. 6 is a schematic interaction diagram of another communication method according to an embodiment of this application.

FIG. 6 is a schematic interaction diagram of another communication method according to an embodiment of this application. As shown in FIG. 6, the method in this embodiment may include part 600 and part 610.

Part 600: A network device sends second configuration information, and a terminal receives the second configuration information. The second configuration information includes first time information or second time information. Optionally, the second configuration information is carried by higher layer signaling (for example, RRC signaling).

Part 610: The terminal performs, based on the first time information or the second time information, a CSI operation corresponding to a second secondary component carrier, or the terminal performs, based on the first time information or the second time information, a CSI operation corresponding to a BWP of the second secondary component carrier, where the BWP is a first active BWP. The CSI operation includes one or more of the following: aperiodic CSI reporting, aperiodic CSI measurement, periodic measurement, semi-persistent CSI reporting, or semi-persistent CSI measurement.

Optionally, the communication method provided in this embodiment of this application shown in FIG. 6 may further include part 620: The network device receives, based on the first time information or the second time information, a CSI report corresponding to the second secondary component carrier from the terminal, or the network device receives, based on the first time information or the second time information, a CSI report corresponding to a BWP of the second secondary component carrier from the terminal, where the second secondary component carrier is in a deactivated state, and the BWP is a first active BWP. The CSI report is an aperiodic CSI report or a semi-persistent CSI report.

In a possible implementation of part 600, the network device determines, based on an activation status of the second secondary component carrier, that the sent second configuration information includes the first time information or the second time information. When the second secondary component carrier is in an activated state, the network device determines that the second configuration information includes the first time information. When the second secondary component carrier is in a deactivated state, the network device determines that the second configuration information includes the second time information.

For descriptions of the first time information and the second time information, refer to the descriptions in FIG. 5. Details are not described herein again.

In the foregoing implementation, the network device may properly configure time information of the CSI operation based on the activation status of the secondary component carrier, thereby reducing implementation complexity of the terminal.

It may be understood that the method shown in FIG. 6 may be implemented in combination with the method shown in FIG. 3, and the second secondary component carrier shown in FIG. 6 and the first secondary component carrier shown in FIG. 3 may be a same secondary component carrier.

The correspondences shown in the foregoing tables may be configured, or may be predefined. Values of the information in the tables are merely examples, and other values may be configured. This is not limited in this application. When a correspondence between information and each parameter is configured, not all correspondences shown in the tables need to be configured. For example, in the foregoing tables, correspondences shown in some rows may not be configured. For another example, appropriate transformation and adjustments such as splitting and combination may be performed based on the foregoing tables. Names of the parameters shown in titles of the foregoing tables may alternatively be other names that can be understood by a communication device, and values or representation manners of the parameters may alternatively be other values or representation manners that can be understood by the communication device. During implementation of the foregoing tables, another data structure, such as an array, a queue, a container, a stack, a linear table, a pointer, a linked list, a tree, a graph, a structure, a class, a pile, or a hash table, may be used.

Predefining in this application may be understood as "define", "predefine", "store", "pre-store", "pre-negotiate", "pre-configure", "solidify", or "pre-burn".

The description in this application that a and b satisfy a relationship (which may also be understood as a functional relationship) does not forcibly require that a and b precisely satisfy the relationship. For example, if a value a' and the value b precisely satisfy the relationship, a value a obtained after an operation of floating-point removal, rounding, or rounding off is performed on the value a' may also be understood as that a and b satisfy the relationship. It may be understood that, that a and b satisfy a relationship may alternatively be that a and b satisfy a relationship obtained after equivalent transformation is performed on the relationship. This is not limited in the embodiments of this application. In addition, it may be understood that a specific implementation in which a and b satisfy a relationship is not limited in the embodiments of this application. For example, the mapping manner may be implemented by using a formula, or the mapping manner may be implemented in a form of a table, or the mapping manner may be implemented in another manner. This is not limited in the embodiments of this application.

It may be understood that the methods implemented by the communication device in the foregoing method embodiments may alternatively be implemented by a component (for example, an integrated circuit or a chip) that can be used in the communication device.

In correspondence to the communication methods provided in the foregoing method embodiments, an embodiment of this application further provides a corresponding communication apparatus (which may also be referred to as a communication device). The communication apparatus includes a corresponding module configured to perform each part in the foregoing embodiments. The module may be software, hardware, or a combination of software and hardware.

Figure 7:
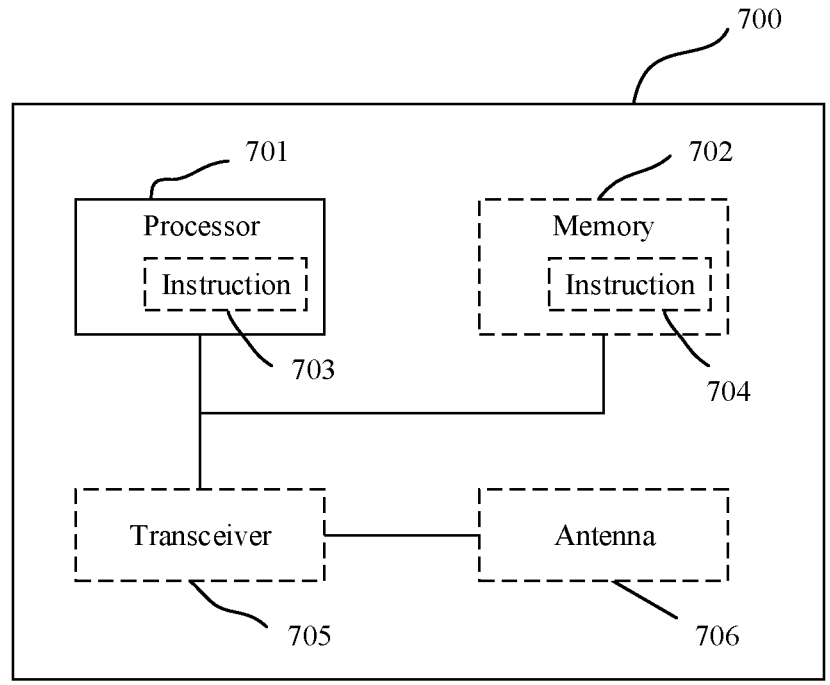
FIG. 7 is a schematic structural diagram of a communication apparatus according to an embodiment of this application.

FIG. 7 is a schematic structural diagram of a communication apparatus. The communication apparatus 700 may be the network device 10 or 20 in FIG. 1, or may be the terminal 11, 12, 21, or 22 in FIG. 1. The communication apparatus may be configured to implement the method that corresponds to the terminal or the network device and that is described in the foregoing method embodiments. For details, refer to the descriptions in the foregoing method embodiments.

The communication apparatus 700 may include one or more processors 701. The processor 701 may also be referred to as a processing unit, and can implement a specific control function. The processor 701 may be a general-purpose processor, a dedicated processor, or the like. For example, the processor 701 may be a baseband processor or a central processing unit. The baseband processor may be configured to process a communication protocol and communication data. The central processing unit may be configured to: control the communication apparatus (for example, a base station, a baseband chip, a DU, or a CU), execute a software program, and process data of the software program.

In an optional design, the processor 701 may also store an instruction and/or data 703. The instruction and/or data 703 may be run by the processor, so that the communication apparatus 700 performs a method that corresponds to the communication device and that is described in the foregoing method embodiments.

In another optional design, the processor 701 may include a transceiver unit configured to implement receiving and sending functions. For example, the transceiver unit may be a transceiver circuit or an interface. A circuit or an interface configured to implement the receiving function and a circuit or an interface configured to implement the sending function may be separated or may be integrated together.

In another possible design, the communication apparatus 700 may include a circuit, and the circuit may implement the sending, receiving, or communication function in the foregoing method embodiments. Optionally, the communication apparatus 700 in this embodiment of this application may be configured to perform the method described in FIG. 3, FIG. 5, or FIG. 6 in the embodiments of this application.

Optionally, the communication apparatus 700 may include one or more memories 702. The memory may store an instruction 704, and the instruction may be run on the processor, so that the communication apparatus 700 performs the method described in the foregoing embodiments. Optionally, the memory may further store data. Optionally, the processor may further store an instruction and/or data. The processor and the memory may be separately disposed, or may be integrated together. For example, various correspondences described in the foregoing method embodiments may be stored in the memory, or may be stored in the processor.

The communication apparatus 700 may further include a transceiver 705 and/or an antenna 706. The processor 701 may be referred to as a processing unit, and controls the communication apparatus (a terminal or a network device). The transceiver 705 may be referred to as a transceiver unit, a transceiver machine, a transceiver circuit, a transceiver, or the like, and is configured to implement a transceiver function of the communication apparatus.

In a possible design, a communication apparatus 700 (for example, an integrated circuit, a wireless device, a circuit module, a network device, or a terminal) may include a processor 701 and a transceiver 705. The transceiver 705 receives first control information, where the first control information is used to trigger CSI reporting corresponding to a first secondary component carrier, and the first secondary component carrier is in a deactivated state. The processor 701 controls, based on the first control information, the transceiver 705 to report a CSI report corresponding to the first secondary component carrier. The CSI reporting may be aperiodic CSI reporting or semi-persistent CSI reporting, and the CSI report is an aperiodic CSI report or a semi-persistent CSI report. There may be one or more first secondary component carriers. Optionally, the first control information is DCI, and the DCI is carried by a PDCCH. Optionally, the reported CSI report corresponding to the first secondary component carrier is carried by a PUSCH.

According to the communication apparatus provided in this embodiment of this application, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

Optionally, the first control information is used to trigger CSI reporting corresponding to a BWP of the first secondary component carrier, and the BWP is a first active BWP. The processor 701 controls, based on the first control information, the transceiver 705 to perform the CSI reporting corresponding to the BWP of the first secondary component carrier. In this implementation, CSI reporting corresponding to a BWP of a to-be-activated secondary component carrier can be triggered by using physical layer signaling. Because processing on the physical layer signaling is quicker, the CSI reporting corresponding to the BWP of the secondary component carrier is quicker, so that the network device can learn of an activation status of the secondary component carrier more quickly, thereby reducing time required for a secondary component carrier activation procedure.

In some possible implementations of the communication apparatus 700, the first control information may be further used to trigger to activate the first secondary component carrier. Optionally, the processor 701 controls, based on the first control information, the communication apparatus 700 to activate the first secondary component carrier. In this implementation, the first control information can not only be used to trigger the terminal to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

In some possible implementations of the communication apparatus 700, the transceiver 705 may further receive second control information, where the second control information is used to trigger to activate the first secondary component carrier. Optionally, the second control information is carried by a MAC CE. Optionally, the processor 701 controls, based on the second control information, the communication apparatus 700 to activate the first secondary component carrier. Optionally, after the transceiver 705 receives the second control information, the processor 701 controls, based on the first control information, the transceiver 705 to perform the CSI reporting corresponding to the first secondary component carrier. Optionally, before the transceiver 705 receives the first control information, the transceiver 705 sends feedback information corresponding to the second control information, where the feedback information may be acknowledgment (acknowledgement, ACK) information.

In another possible design, a communication apparatus 700 (for example, an integrated circuit, a wireless device, a circuit module, a network device, or a terminal) may include a processor 701 and a transceiver 705. The transceiver 705 receives first configuration information, where the first configuration information includes first time information and second time information. The processor 701 controls, based on the first time information or the second time information, the transceiver 705 or the communication apparatus 700 to perform a CSI operation corresponding to a second secondary component carrier. The CSI operation includes one or more of the following: aperiodic CSI reporting, aperiodic CSI measurement, semi-persistent CSI reporting, or semi-persistent CSI measurement. Optionally, the first configuration information is carried by higher layer signaling (for example, RRC signaling).

In some possible implementations of the communication apparatus 700, the processor 701 determines, based on an activation status of the second secondary component carrier, to use the first time information or the second time information to control the transceiver 705 or the communication apparatus 700 to perform the CSI operation corresponding to the second secondary component carrier. Optionally, when the second secondary component carrier is in an activated state, the processor 701 controls, based on the first time information, the transceiver 705 or the communication apparatus 700 to perform the CSI operation corresponding to the second secondary component carrier. Optionally, when the second secondary component carrier is in a deactivated state, the processor 701 controls, based on the second time information, the transceiver 705 or the communication apparatus 700 to perform the CSI operation corresponding to the second secondary component carrier.

In the foregoing implementation, time information of the CSI operation can be properly configured based on an activation status of a secondary component carrier, so that time requirements of different secondary component carrier types on the CSI operation can be met, thereby improving CSI operation efficiency in carrier aggregation.

In another possible design, a communication apparatus 700 (for example, an integrated circuit, a wireless device, a circuit module, a network device, or a terminal) may include a transceiver 705. The transceiver 705 sends first control information to a terminal, where the first control information includes CSI request information corresponding to a first secondary component carrier, where the CSI request information is used to trigger the terminal to perform CSI reporting corresponding to the first secondary component carrier, the CSI reporting may be aperiodic CSI reporting or semi-persistent CSI reporting, and the first secondary component carrier is in a deactivated state. The transceiver 705 receives a CSI report corresponding to the first secondary component carrier from the terminal, where the CSI report is an aperiodic CSI report or a semi-persistent CSI report. There may be one or more first secondary component carriers. Optionally, the first control information is DCI, and the DCI is carried by a PDCCH. Optionally, the CSI report is carried by a PUSCH.

In the foregoing implementation, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

Optionally, the CSI request information corresponding to the first secondary component carrier includes CSI request information corresponding to a BWP of the first secondary component carrier, and the BWP is a first active BWP. The transceiver 705 receives a CSI report corresponding to the BWP of the first secondary component carrier from the terminal. In this implementation, CSI reporting corresponding to a BWP of a to-be-activated secondary component carrier can be triggered by using physical layer signaling. Because processing on the physical layer signaling is quicker, the CSI reporting corresponding to the BWP of the secondary component carrier is quicker, so that the network device can learn of an activation status of the secondary component carrier more quickly, thereby reducing time required for a secondary component carrier activation procedure.

In some possible implementations of the communication apparatus 700, the first control information includes trigger activation information corresponding to the first secondary component carrier, and the trigger activation information is used to trigger to activate the first secondary component carrier. In this implementation, the first control information can not only be used to trigger to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

In some possible implementations of the communication apparatus 700, the transceiver 705 may further send second control information to the terminal, where the second control information includes trigger activation information corresponding to the first secondary component carrier, and the trigger activation information is used to trigger to activate the first secondary component carrier. Optionally, the second control information is carried by a MAC CE. Optionally, after the transceiver 705 sends the second control information to the terminal, the transceiver 705 receives a CSI report corresponding to the first secondary component carrier from the terminal. Optionally, before the transceiver 705 sends the first control information to the terminal and after the transceiver 705 sends the second control information to the terminal, the transceiver 705 receives feedback information corresponding to the second control information from the terminal, where the feedback information may be ACK information.

In another possible design, a communication apparatus 700 (for example, an integrated circuit, a wireless device, a circuit module, a network device, or a terminal) may include a processor 701 and a transceiver 705. The transceiver 705 sends first configuration information to a terminal, where the first configuration information includes first time information and second time information. The processor 701 controls, based on the first time information or the second time information, the transceiver 705 to receive a CSI report corresponding to a second secondary component carrier from the terminal, where the CSI report is an aperiodic CSI report or a semi-persistent CSI report. Optionally, the first configuration information is carried by higher layer signaling.

In some possible implementations of the communication apparatus 700, the processor 701 determines, based on an activation status of the second secondary component carrier, to use the first time information or the second time information to control the transceiver 705 to receive the CSI report corresponding to the second secondary component carrier from the terminal. Optionally, when the second secondary component carrier is in an activated state, the processor 701 controls, based on the first time information, the transceiver 705 to receive the CSI report corresponding to the second secondary component carrier from the terminal. Optionally, when the second secondary component carrier is in a deactivated state, the processor 701 controls, based on the second time information, the transceiver 705 to receive the CSI report corresponding to the second secondary component carrier from the terminal.

In the foregoing implementation, time information of the CSI operation can be properly configured based on an activation status of a secondary component carrier, so that time requirements of different secondary component carrier types on the CSI operation can be met, thereby improving CSI operation efficiency in carrier aggregation.

The processor and the transceiver that are described in this application may be implemented on an integrated circuit (integrated circuit, IC), an analog IC, a radio frequency integrated circuit RFIC, a hybrid signal IC, an application-specific integrated circuit (application specific integrated circuit, ASIC), a printed circuit board (printed circuit board, PCB), an electronic device, or the like. The processor and the transceiver may alternatively be manufactured by using various IC process technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

In the descriptions of the foregoing embodiments, the communication apparatus is described by using the network device or the terminal as an example. However, a scope of the communication apparatus described in this application is not limited thereto, and a structure of the communication apparatus may not be limited by FIG. 7. The communication apparatus may be an independent device or may be a part of a relatively large device. For example, the device may be:

(1) an independent integrated circuit IC, a chip, or a chip system or subsystem;

(2) a set including one or more ICs, where optionally, the IC set may further include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld phone, a mobile unit, a vehicle-mounted device, a network device, a cloud device, an artificial intelligence device, or the like; or (6) others or the like.

Figure 8:
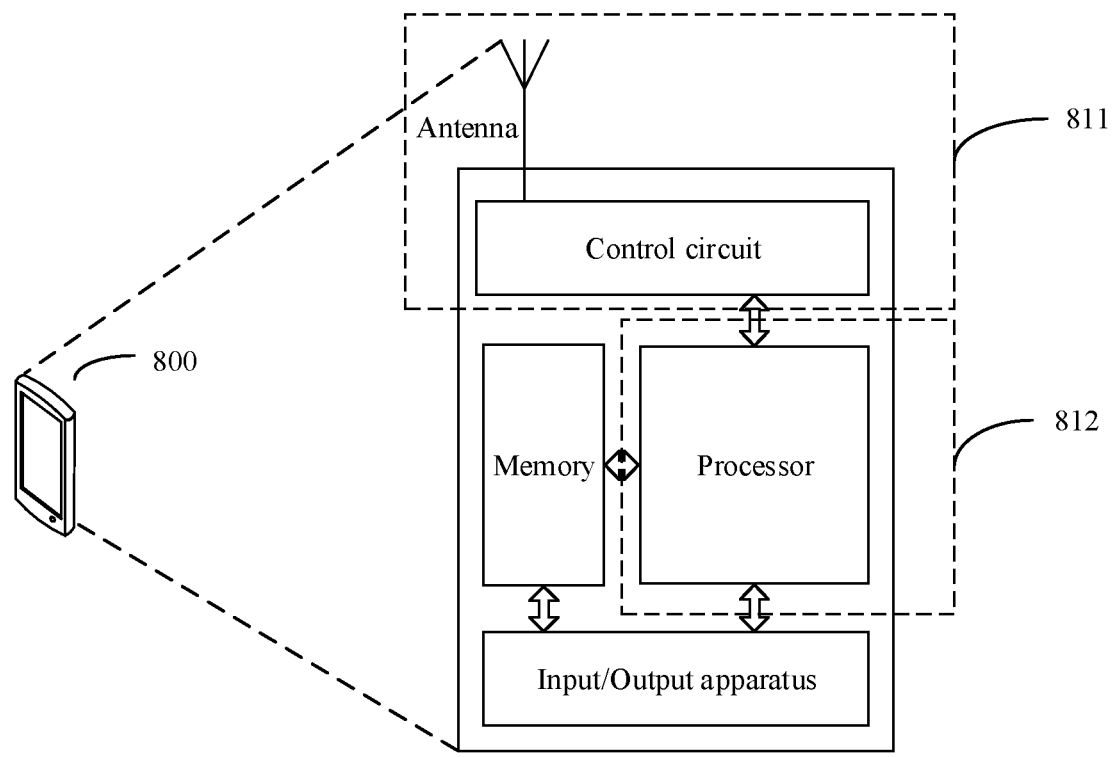
FIG. 8 is a schematic structural diagram of a terminal according to an embodiment of this application.

FIG. 8 is a schematic structural diagram of a terminal. The terminal is applicable to the system shown in FIG. 1. For ease of description, FIG. 8 shows merely main components of the terminal. As shown in FIG. 8, the terminal 800 includes a processor, a memory, a control circuit, an antenna, and an input/output apparatus. The processor is mainly configured to: process a communication protocol and communication data, control the entire terminal, execute a software program, and process data of the software program. The memory is configured to store the software program and the data. The radio frequency circuit is mainly configured to perform conversion between a baseband signal and a radio frequency signal, and process the radio frequency signal. The antenna is mainly configured to receive and send a radio frequency signal in an electromagnetic wave form. The input/output apparatus, for example, a touchscreen, a display screen, or a keyboard, is mainly configured to receive data entered by a user and output data to the user.

After user equipment is powered on, the processor may read a software program stored in a storage unit, parse and execute instructions of the software program, and process data of the software program. When data needs to be sent in a wireless manner, after performing baseband processing on the to-be-sent data, the processor outputs a baseband signal to the radio frequency circuit. After processing the baseband signal, the radio frequency circuit obtains a radio frequency signal and sends the radio frequency signal to the outside through the antenna in a form of an electromagnetic wave. When data is sent to the user equipment, the radio frequency circuit receives a radio frequency signal through the antenna, further converts the radio frequency signal into a baseband signal, and outputs the baseband signal to the processor, and the processor converts the baseband signal into data and processes the data.

A person skilled in the art may understand that, for ease of description, FIG. 8 shows only one memory and one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. The processor in FIG. 8 integrates functions of the baseband processor and the central processing unit. A person skilled in the art may understand that the baseband processor and the central processing unit may be processors independent of each other, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

In an example, the antenna and the control circuit that have receiving and sending functions may be considered as a transceiver unit 811 of the terminal 800, and the processor having a processing function may be considered as a processing unit 812 of the terminal 800. As shown in FIG. 8, the terminal 800 includes the transceiver unit 811 and the processing unit 812. The transceiver unit may also be referred to as a transceiver, a transceiver machine, a transceiver apparatus, or the like. Optionally, a component that is in the transceiver unit 811 and that is configured to implement a receiving function may be considered as a receiving unit, and a component that is in the transceiver unit 811 and that is configured to implement a sending function may be considered as a sending unit. In other words, the transceiver unit 811 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be at one geographical location, or may be scattered at a plurality of geographical locations.

Figure 9:
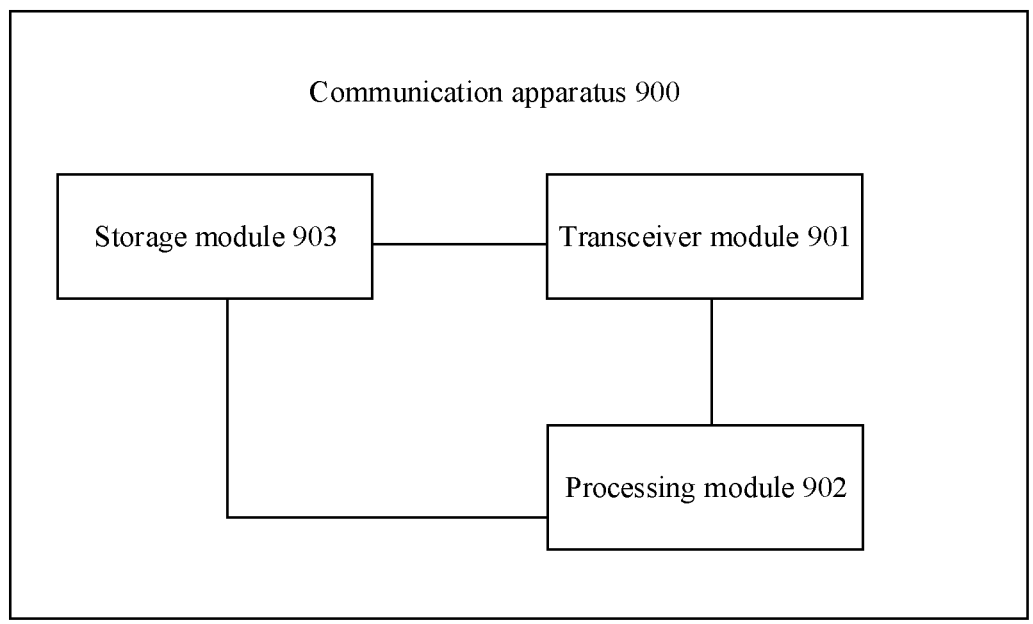
FIG. 9 is a schematic diagram of a communication device according to an embodiment of this application.

As shown in FIG. 9, another embodiment of this application provides a communication apparatus 900. The communication apparatus may be a terminal (for example, a terminal in the system shown in FIG. 1) or a component (for example, an integrated circuit or a chip) of a terminal. Alternatively, the communication apparatus may be a network device (where for example, the communication apparatus is a base station device that can be used in the system in FIG. 1) or a component (for example, an integrated circuit or a chip) of a network device. Alternatively, the communication apparatus may be another communication module, configured to implement an operation corresponding to a communication device or node in the method embodiments of this application. The communication apparatus 900 may include a processing module 902 (a processing unit). The communication apparatus 900 may further include a transceiver module 901 (transceiver unit) and/or a storage module 903 (storage unit).

In a possible design, one or more modules in FIG. 9 may be implemented by one or more processors, may be implemented by one or more processors and memories, may be implemented by one or more processors and transceivers, or may be implemented by one or more processors, memories, and transceivers. This is not limited in the embodiments of this application. The processor, the memory, and the transceiver may be separately disposed, or may be integrated together.

The communication apparatus has a function of implementing the terminal described in the embodiments of this application. For example, the communication apparatus includes modules, units, or means (means) that are of the terminal and that correspond to the steps performed by the terminal described in the embodiments of this application, and the functions, units, or means may be implemented by software, may be implemented by hardware, or may be implemented by hardware executing corresponding software. For details, refer to corresponding descriptions in the foregoing corresponding method embodiments.

Alternatively, the communication apparatus has a function of implementing the network device described in the embodiments of this application. For example, the communication apparatus includes corresponding modules, units, or means that are of the network device and that correspond to the steps performed by the network device described in the embodiments of this application, and the functions, units, or means may be implemented by software, may be implemented by hardware, or may be implemented by hardware executing corresponding software. For details, refer to corresponding descriptions in the foregoing corresponding method embodiments.

Optionally, the modules in the communication apparatus 900 in this embodiment of this application may be configured to perform the method described in FIG. 3, FIG. 5, or FIG. 6 in the embodiments of this application.

In a possible design, a communication apparatus 900 may include a transceiver module 901 and a processing module 902. The transceiver module 901 receives first control information, where the first control information is used to trigger CSI reporting corresponding to a first secondary component carrier, and the first secondary component carrier is in a deactivated state. The processing module 902 controls, based on the first control information, the transceiver module 901 to report a CSI report corresponding to the first secondary component carrier. The CSI reporting may be aperiodic CSI reporting or semi-persistent CSI reporting, and the CSI report is an aperiodic CSI report or a semi-persistent CSI report. There may be one or more first secondary component carriers. Optionally, the first control information is DCI, and the DCI is carried by a PDCCH. Optionally, the reported CSI report corresponding to the first secondary component carrier is carried by a PUSCH.

According to the communication apparatus provided in this embodiment of this application, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

Optionally, the first control information is used to trigger CSI reporting corresponding to a BWP of the first secondary component carrier, and the BWP is a first active BWP. The processing module 902 controls, based on the first control information, the transceiver module 901 to perform the CSI reporting corresponding to the BWP of the first secondary component carrier. In this implementation, CSI reporting corresponding to a BWP of a to-be-activated secondary component carrier can be triggered by using physical layer signaling. Because processing on the physical layer signaling is quicker, the CSI reporting corresponding to the BWP of the secondary component carrier is quicker, so that the network device can learn of an activation status of the secondary component carrier more quickly, thereby reducing time required for a secondary component carrier activation procedure.

In some possible implementations of the communication apparatus 900, the first control information may be further used to trigger to activate the first secondary component carrier. Optionally, the processing module 902 controls, based on the first control information, the communication apparatus 900 to activate the first secondary component carrier. In this implementation, the first control information can not only be used to trigger the terminal to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

In some possible implementations of the communication apparatus 900, the transceiver module 901 may further receive second control information, where the second control information is used to trigger to activate the first secondary component carrier. Optionally, the second control information is carried by a MAC CE. Optionally, the processing module 902 controls, based on the second control information, the communication apparatus 900 to activate the first secondary component carrier. Optionally, after the transceiver module 901 receives the second control information, the processing module 902 controls, based on the first control information, the transceiver module 901 to perform the CSI reporting corresponding to the first secondary component carrier. Optionally, before the transceiver module 901 receives the first control information, the transceiver module 901 sends feedback information corresponding to the second control information, where the feedback information may be acknowledgment (acknowledgement, ACK) information.

In another possible design, a communication apparatus 900 may include a transceiver module 901 and a processing module 902. The transceiver module 901 receives first configuration information, where the first configuration information includes first time information and second time information. The processing module 902 controls, based on the first time information or the second time information, the transceiver module 901 or the communication apparatus 900 to perform a CSI operation corresponding to a second secondary component carrier. The CSI operation includes one or more of the following: aperiodic CSI reporting, aperiodic CSI measurement, semi-persistent CSI reporting, or semi-persistent CSI measurement. Optionally, the first configuration information is carried by higher layer signaling (for example, RRC signaling).

In some possible implementations of the communication apparatus 900, the processing module 902 determines, based on an activation status of the second secondary component carrier, to use the first time information or the second time information to control the transceiver module 901 or the communication apparatus 900 to perform the CSI operation corresponding to the second secondary component carrier. Optionally, when the second secondary component carrier is in an activated state, the processing module 902 controls, based on the first time information, the transceiver module 901 or the communication apparatus 900 to perform the CSI operation corresponding to the second secondary component carrier. Optionally, when the second secondary component carrier is in a deactivated state, the processing module 902 controls, based on the second time information, the transceiver module 901 or the communication apparatus 900 to perform the CSI operation corresponding to the second secondary component carrier.

In the foregoing implementation, time information of the CSI operation can be properly configured based on an activation status of a secondary component carrier, so that time requirements of different secondary component carrier types on the CSI operation can be met, thereby improving CSI operation efficiency in carrier aggregation.

In another possible design, a communication apparatus 900 may include a transceiver module 901. The transceiver module 901 sends first control information to a terminal, where the first control information includes CSI request information corresponding to a first secondary component carrier, where the CSI request information is used to trigger the terminal to perform CSI reporting corresponding to the first secondary component carrier, the CSI reporting may be aperiodic CSI reporting or semi-persistent CSI reporting, and the first secondary component carrier is in a deactivated state. The transceiver module 901 receives a CSI report corresponding to the first secondary component carrier from the terminal, where the CSI report is an aperiodic CSI report or a semi-persistent CSI report. There may be one or more first secondary component carriers. Optionally, the first control information is DCI, and the DCI is carried by a PDCCH. Optionally, the CSI report is carried by a PUSCH.

In the foregoing implementation, CSI reporting of a to-be-activated secondary component carrier can be triggered by using physical layer signaling. Because processing on the physical layer signaling is quicker, the CSI reporting of the secondary component carrier is quicker, so that the network device can learn of an activation status of the secondary component carrier more quickly, thereby reducing time required for a secondary component carrier activation procedure.

Optionally, the CSI request information corresponding to the first secondary component carrier includes CSI request information corresponding to a BWP of the first secondary component carrier, and the BWP is a first active BWP. The transceiver module 901 receives a CSI report corresponding to the BWP of the first secondary component carrier from the terminal. In this implementation, CSI reporting corresponding to a BWP of a to-be-activated secondary component carrier can be triggered by using physical layer signaling. Because processing on the physical layer signaling is quicker, the CSI reporting corresponding to the BWP of the secondary component carrier is quicker, so that the network device can learn of an activation status of the secondary component carrier more quickly, thereby reducing time required for a secondary component carrier activation procedure.

In some possible implementations of the communication apparatus 900, the first control information includes trigger activation information corresponding to the first secondary component carrier, and the trigger activation information is used to trigger to activate the first secondary component carrier. In this implementation, the first control information can not only be used to trigger to perform CSI reporting corresponding to a to-be-activated first secondary component carrier, but also be used to trigger to activate the first secondary component carrier. Therefore, not only time required for a secondary component carrier activation procedure can be reduced, but also signaling overheads can be further reduced.

In some possible implementations of the communication apparatus 900, the transceiver module 901 may further send second control information to the terminal, where the second control information includes trigger activation information corresponding to the first secondary component carrier, and the trigger activation information is used to trigger to activate the first secondary component carrier. Optionally, the second control information is carried by a MAC CE. Optionally, after the transceiver module 901 sends the second control information to the terminal, the transceiver module 901 receives a CSI report corresponding to the first secondary component carrier from the terminal. Optionally, before the transceiver module 901 sends the first control information to the terminal and after the transceiver module 901 sends the second control information to the terminal, the transceiver module 901 receives feedback information corresponding to the second control information from the terminal, where the feedback information may be ACK information.

In another possible design, a communication apparatus 900 may include a transceiver module 901 and a processing module 902. The transceiver module 901 sends first configuration information to a terminal, where the first configuration information includes first time information and second time information. The processing module 902 controls, based on the first time information or the second time information, the transceiver module 901 to receive a CSI report corresponding to a second secondary component carrier from the terminal, where the CSI report is an aperiodic CSI report or a semi-persistent CSI report. Optionally, the first configuration information is carried by higher layer signaling.

In some possible implementations of the communication apparatus 900, the processing module 902 determines, based on an activation status of the second secondary component carrier, to use the first time information or the second time information to control the transceiver module 901 to receive the CSI report corresponding to the second secondary component carrier from the terminal. Optionally, when the second secondary component carrier is in an activated state, the processing module 902 controls, based on the first time information, the transceiver module 901 to receive the CSI report corresponding to the second secondary component carrier from the terminal. Optionally, when the second secondary component carrier is in a deactivated state, the processing module 902 controls, based on the second time information, the transceiver module 901 to receive the CSI report corresponding to the second secondary component carrier from the terminal.

In the foregoing implementation, time information of the CSI operation can be properly configured based on an activation status of a secondary component carrier, so that time requirements of different secondary component carrier types on the CSI operation can be met, thereby improving CSI operation efficiency in carrier aggregation.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in the embodiments of this application may also correspondingly implement these features or functions. Details are not described herein.

A person skilled in the art may further understand that various illustrative logical blocks (illustrative logical block) and steps (step) that are listed in the embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. Alternatively, the processor may be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that various reference numerals such as "first" and "second" in this application are merely used for differentiation for ease of description, but are not used to limit the scope of the embodiments of this application, or are used to represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" refers to one or more. At least two refers to two or more. "At least one", "any one", or a similar expression thereof refers to any combination of these items, including a singular item (piece) or any combination of plural items (pieces). For example, at least one (piece, or type) of a, b, or c may represent: a, b, c, a and b, a and c, b and c, or a, b, and c, where a, b, and c may be singular or plural.

Steps of the methods or algorithms described in the embodiments of this application may be directly embedded into hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Optionally, the memory may further be integrated into the processor. The processor and the memory may be arranged in an ASIC, and the ASIC may be arranged in a terminal. Optionally, the processor and the memory may alternatively be disposed in different components of the terminal.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid state-drive Solid State Disk (SSD)), or the like. The foregoing combination shall also be included in the protection scope of the computer-readable medium.

For same or similar parts in the embodiments of this application, refer to each other. In the embodiments of this application and the implementations/implementation methods/implementation methods in the embodiments, unless otherwise specified or a logical conflict occurs, terms and/or descriptions are consistent and may be mutually referenced between different embodiments and between the implementations/implementation methods/implementation methods in the embodiments. Technical features in the different embodiments and the implementations/implementation methods/implementation methods in the embodiments may be combined to form a new embodiment, implementation, implementation method, or implementation method according to an internal logical relationship thereof. The foregoing implementations of this application do not constitute a limitation on the protection scope of this application.

What is claimed is:

1. A communication method performed by a terminal device or a chip system, comprising:
   receiving first control information that is used to trigger a channel state information (CSI) operation corresponding to a bandwidth part (BWP) of a first secondary component carrier in a deactivated state, the BWP being a first active BWP;
   triggering, based on the received first control information, the CSI operation corresponding to the BWP of the first secondary component carrier in the deactivated state, the CSI operation comprising one or more of the following: aperiodic CSI reporting, aperiodic CSI measurement, semi-persistent CSI reporting, or semi-persistent CSI measurement;
   performing CSI measurements according to the first control information;
   receiving second control information that comprises a plurality of bits corresponding to a plurality of respective secondary component carriers, each of the plurality of bits being set to a value indicating to activate or deactivate a corresponding secondary component carrier; and
   sending a CSI report corresponding to the BWP of the first secondary component carrier after receiving the second control information.

2. The method according to claim 1, the method further comprising:
   triggering activation of the first secondary component carrier based upon the received second control information.

3. The method according to claim 1, wherein the first control information includes at least part of the following:
   CSI request information corresponding to the BWP of the first secondary component carrier;
   channel state information reference signal (CSI-RS) resource indication information indicating a resource used by a CSI-RS on the first secondary component carrier;
   uplink resource indication information indicating a resource used for reporting a CSI report; or
   uplink shared channel (UL-SCH) indication information indicating whether a physical uplink shared channel (PUSCH) carries a CSI report corresponding to the BWP of the first secondary component carrier.

4. The method according to claim 1, wherein the first active BWP is a first default BWP configured by using higher layer signaling.

5. The method according to claim 1, wherein the first control information is used to trigger both activation of the first secondary component carrier and the CSI operation corresponding the BWP; and wherein the CSI report indicates that the first secondary component carrier is activated.

6. The method according to claim 1, wherein the first control information is carried by a physical downlink control channel (PDCCH) and the second control information is carried by a media access control control element (MAC CE).

7. An apparatus, comprising:
   one or more processors;
   a non-transitory memory coupled to the one or more processors, the non-transitory memory being configured to store instructions that, when executed by the one or more processors, cause the apparatus to:
   receive first control information that is used to trigger a channel state information (CSI) operation corresponding to a bandwidth part (BWP) of a first secondary component carrier in a deactivated state, the BWP being a first active BWP;
   trigger the CSI operation corresponding to the BWP of the first secondary component carrier in deactivated state based upon the received first control information, the CSI operation comprising one or more of the following: aperiodic CSI reporting, aperiodic CSI measurement, semi-persistent CSI reporting, or semi-persistent CSI measurement;
   perform measurements according to the first control information;
   receive second control information that comprises a plurality of bits corresponding to a plurality of respective secondary component carriers, each of the plurality of bits being set to a value indicating to activate or deactivate a corresponding secondary component carrier; and
   send a CSI report corresponding to the BWP of the first secondary component carrier after receiving the second control information.

8. The apparatus according to claim 7, wherein execution of the instructions by the one or more processors causes the apparatus to trigger activation of the first secondary component carrier based upon the second control information.

9. The apparatus according to claim 7, wherein the first control information includes at least part of the following:
CSI request information corresponding to the BWP of the first secondary component carrier;
channel state information reference signal (CSI-RS) resource indication information indicating a resource used by a CSI-RS on the first secondary component carrier;
uplink resource indication information indicating a resource used for reporting a CSI report; or
uplink shared channel (UL-SCH) indication information indicating whether a physical uplink shared channel (PUSCH) carries a CSI report corresponding to the BWP of the first secondary component carrier.

10. The apparatus according to claim 7, wherein the first active BWP is a first default BWP configured by using higher layer signaling.

11. The apparatus according to claim 7, wherein the first control information is used to trigger both activation of the first secondary component carrier and the CSI operation corresponding the BWP; and wherein the CSI report indicates that the first secondary component carrier is activated.

12. The apparatus according to claim 7, wherein the first control information is carried by a physical downlink control channel (PDCCH) and the second control information is carried by a media access control control element (MAC CE).

13. A non-transitory computer readable medium storing instructions that, when executed by a computer, cause the computer to:
receive first control information that is used to trigger a channel state information (CSI) operation corresponding to a bandwidth part (BWP) of a first secondary component carrier in a deactivated state, the BWP being a first active BWP;
trigger the CSI operation corresponding to the BWP of the first secondary component carrier in the deactivated state based upon the first control information, the CSI operation comprising one or more of the following: aperiodic CSI reporting, aperiodic CSI measurement, semi-persistent CSI reporting, or semi-persistent CSI measurement;
perform CSI measurements according to the first control information;
receive second control information that comprises a plurality of bits corresponding to a plurality of respective secondary component carriers, each of the plurality of bits being set to a value indicating to activate or deactivate a corresponding secondary component carrier; and
send a CSI report corresponding to the BWP of the first secondary component carrier after receiving the second control information.

14. The non-transitory computer readable medium according to claim 13, wherein execution of the instructions by the computer causes the computer to trigger activation of the first secondary component carrier based upon the second control information.

15. The non-transitory computer readable medium according to claim 13, wherein the first control information includes at least part of the following:
CSI request information corresponding to the BWP of the first secondary component carrier;
channel state information reference signal (CSI-RS) resource indication information indicating a resource used by a CSI-RS on the first secondary component carrier;
uplink resource indication information indicating a resource used for reporting a CSI report; or
uplink shared channel (UL-SCH) indication information indicating whether a physical uplink shared channel (PUSCH) carries a CSI report corresponding to the BWP of the first secondary component carrier.

16. The non-transitory computer readable medium according to claim 13, wherein the first control information is used to trigger both activation of the first secondary component carrier and the CSI operation corresponding the BWP; and wherein the CSI report indicates that the first secondary component carrier is activated.

17. The non-transitory computer readable medium according to claim 13, wherein the first control information is carried by a physical downlink control channel (PDCCH) and the second control information is carried by a media access control control element (MAC CE).

* * * * *